May 20, 1969 G. C. DRISCOLL 3,445,822

COMMUNICATION ARRANGEMENT IN DATA PROCESSING SYSTEM

Filed July 14, 1967 Sheet 1 of 17

INVENTOR
GRAHAM C. DRISCOLL

BY Isidore Match

ATTORNEY

May 20, 1969 G. C. DRISCOLL 3,445,822

COMMUNICATION ARRANGEMENT IN DATA PROCESSING SYSTEM

Filed July 14, 1967

Sheet 11 of 17

3,445,822
Patented May 20, 1969

3,445,822

COMMUNICATION ARRANGEMENT IN DATA PROCESSING SYSTEM

Graham C. Driscoll, Yorktown Heights, N.Y., assignor to International Business Machines Corporation, Armonk, N.Y., a corporation of New York Filed July 14, 1967, Ser. No. 653,535
Int. Cl. G11b 13/00
U.S. Cl. 340—172.5 10 Claims

ABSTRACT OF THE DISCLOSURE

A communication arrangement in a multi-processing system wherein each processor has associated therewith an interaction control unit, all of the control units being interconnected by a common bus. This construction enables direct intercommunication between the control units. Each control unit is provided with a unique bus seizure code which it can gate to the bus and then compare the bus code setting with its own code. If the code and setting are found to be equal, the bus is available. If they are found not to be equal, then two units are simultaneously attempting to seize the bus. For the latter contingency, a tie-breaking scheme is provided, each unit being provided with a unique index which is considered in the determining as to which unit is to win a tie. There is further included an arrangement which enables a control unit which has control of the bus to ascertain which of the other control units are working on the same job as it is.

BACKGROUND OF THE INVENTION

This invention relates to intracommunication arrangements in data processing systems. More particularly, it relates to an improved arrangement for enabling the communication on a common bus between a multiplicity of active units in a data processing system.

In data processing systems in which several discrete autonomous processing units are arranged so as to share a common work load, i.e., multiprocessing systems, for example, considerations of efficiency of operation of the latter systems entail the need for communication between discrete units and the capability of influencing the course of one another's operation. Such communication can, of course, be effected entirely through main storage. However, the latter type communication is inherently wasteful in that it requires continual interrogation of storage. Accordingly, it is quite evident that direct interaction between units in multiprocessing systems could result in greatly enhanced efficiency of operation.

Where parallel processing is implemented in a multiprocessing system, there is achieved a wider distribution of functions throughout the system and the amount of interrupts may be diminished thereby. However, even where parallel processing is not being effected, needs for interaction between units occur in a great many situations.

Typically, examples of areas wherein interaction is desirable are the problem area, i.e., the satisfaction of logical dependencies within a job; the supervisory area, i.e., the allocation of resources; and the system area, i.e., the coordination of the physical operations of the autonomous units. Thus, in the problem area, a program may call for interaction typically for interlocks and forced branches, such interlocks reflecting logical dependencies between parts of a problem. An efficient mechanism for handling these interlocks is necessary in order to make it profitable to process in parallel, those components of the problem which are substantially independent. In the supervisory area, it may be necessary to shift to a task of a high-priority job or to interrupt where too much time has been spent on a given task. In the system area, for example, there may be required the monitoring of queues to prevent needless accessing, the isolation of malfunctioning units, and interlocks to prevent the simultaneous use of a queue by several units.

In the patent application of Mans P. Schlaeppi for "Control Mechanism for a Multi-Processor Computing System," S.N. 607,040, filed Jan. 3, 1967, and assigned to the assignee of this application, there is disclosed a multiprocessor computing system which includes a plurality of individual processor units which share a common central memory system and wherein each processor is connected directly to an interaction control unit that is controlled independently of the processor sequence control, the interaction unit being operative in response to commands from either an associated processor or from another interaction control unit. Commands between interaction control units are transmitted by a common bus which is provided for linking together all of the interaction control units respectively associated with each processor. Means are included within each of the interaction control units for operating in response to commands appearing on the common bus transmitted by other interaction control units as well as in response to commands issued by the processor to which a given interaction control unit is directly connected. However, commands issued by a processor other than that directly connected with the aforesaid given control unit may not directly influence the latter control unit.

In the embodiment disclosed in the above-referenced patent application, the common bus linking the interaction control units functions analogously to that of a telephone line wherein only one person can talk at any one time. To this end, means are respectively provided within the interaction control units for the passing of control of the bus between the several control units in a "round-robin" sequence and for the maintaining of control of the bus by a given control unit until the latter control unit no longer needs the bus. Additional means are provided whereby a given control unit may request the services of one or several of the other control units and wherein the other control units may indicate whether they are currently able to accept the request for service.

The embodiment disclosed in the above-set forth patent application is efficacious in that it permits the various processors of a multiprocessor system to communicate with each other through the direct interaction of their respective associated interaction control units and thereby enables a significant reduction of direct memory accesses for such interaction through interaction wiring, conventional storage registers and the like. Consequently, such operations are queue lockout, queue access, stop working on task, find processor, highest or lowest priority, etc., are economically executed thereby. However, it presents the deficiency in that in order to send a message without interference, a control unit has to have command of the bus, such command being allocated by having it pass cyclically and by having each control unit, upon completion of any transmission it may have to make, pass command of the bus to its successor. This in turn results in inefficient operation in that all too frequently, a control unit wishing to transmit may have to wait while a multiplicity of other control units, none needing the bus, cyclically passed the command thereof around to it.

Thus, to improve the efficiency of operation of the arrangement disclosed in the above-referenced patent application, S.N. 607,040, it is necessary that the bus not be under the command of any control unit, i.e., that it be in an available state when it is not needed by any control unit. Since such construction could possibly result in a situation in which a plurality of control units might simultaneously attempt to seize control of the bus, there exists the concomitant requirement that a tie-breaking arrangement be provided and which gives a fixed chosen precedence to the control units.

Accordingly, it is an important object of this invention to provide in a multiprocessing system, an arrangement wherein the active units of the system can intercommunicate on a common bus and wherein, the bus is maintained in an available state for use by any of the units when it is not in current use.

It is another object to provide an arrangement in accordance with the preceding object wherein a tie-breaking arrangement is provided which also gives a fixed precedence to the units relative to the availability of the bus.

It is a further object to provide an arrangement in accordance with the preceding objects which facilitates the carrying out of certain functions such as counting and ascertaining the maxima and minima.

SUMMARY OF THE INVENTION

In accordance with the invention there is provided in a data processing system including a plurality of active entities, an interaction control arrangement for enabling intercommunication between the entities. The control arrangement comprises an interaction control unit associated with each active entity, each of which includes means responsive to commands from its associated entity for executing instruction sequences specified by the entity. There are further provided in each interaction control unit means for executing sequences specified by other control units. A common bus means connects each control unit. Each control unit also includes means for providing a unique bus seizure code therefor, means for transmitting such seizure code to the bus and means for ascertaining the seizure code on the bus. Comparing means are included in each control unit for determining whether its unique seizure code transmitted to the bus and the seizure code ascertained as being on the bus are equal or not equal, i.e., the same or different. If the compared transmitted and received codes are equal, such comparison represents the availability state of the bus. If they are not equal such comparison represents the fact that another unit is concurrently attempting to seize the bus.

The foregoing and other objects, features and advantages of the invention will be apparent from the following more particular description of a preferred embodiment of the invention, as illustrated in the accompanying drawings.

DESCRIPTION OF A PREFERRED EMBODIMENT

Figure 1:
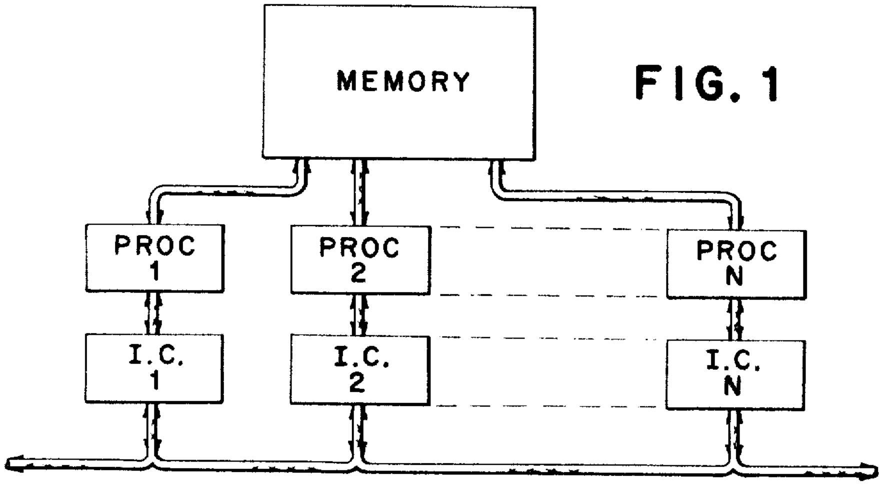
FIG. 1 is a block diagram of a multi-processing system comprising a plurality of processors communicating with a common memory, each of the processors having respectively associated therewith an interaction controller, all of the controllers being interconnected by a common bus.

As shown in FIG. 1 of the above-referred to patent application, S.N. 607,040, and in FIG. 1 of the drawings, the overall arrangement of a multiprocessing system comprising a plurality of processors includes an interaction control unit, suitably referred to as an interaction controller, associated with each processor respectively. Each processor 1–N is connected directly to its associated interaction controller (I.C.) and all of the interaction controllers are connected directly to a common interaction bus.

Each of these controllers contains means responsive to commands from its associated processor to execute instruction sequences specified by the latter processor and also contains means to execute instruction sequences specified by other controllers.

As will be shown hereinbelow, according to the invention, rather than having control passed to the same successor interaction controller in a round-robin sequential cycle independent of need for the bus, the control of the bus is passed to an interaction controller that is waiting for the bus. If more than one controller is so waiting, then a determination is made according to the index numbers of the waiting controllers. The latter determination may be generally described as being made in the following manner. The waiting interaction controllers are divided into two classes, a first class comprising those interaction controllers with index numbers that are less than that of the releasing controller and a second class comprising those interaction controllers whose index numbers are greater than that of the releasing controller. If there exist waiting interaction controllers in the first class, then the controller in this first class with the highest index number is selected and is given control of the bus. If there are no waiting interaction controllers in the first class, then the second class of controllers is examined and the controller with the highest index number in the second class is selected and is given control of the bus. If there are no waiting controllers in either class, then the bus is in the "available" state.

The index number of each controller consists of two digits, conveniently octal digits, and for convenience of description, designated $I_1$ and $I_2$ respectively. If it is assumed that $I_1$ designates the higher order digit and that $I_2$ designates the lower order digit, then the index numbers can thus vary from 00 (base 8) to 77 (base 8). The octal digits from 0 thru 7 are encoded according to the table set forth immediately hereinbelow:

| Octal digit: | Encoded representation |
|---|---|
| 0 | 1 0 0 0 0 0 0 0 |
| 1 | 1 1 0 0 0 0 0 0 |
| 2 | 1 1 1 0 0 0 0 0 |
| 3 | 1 1 1 1 0 0 0 0 |
| 4 | 1 1 1 1 1 0 0 0 |
| 5 | 1 1 1 1 1 1 0 0 |
| 6 | 1 1 1 1 1 1 1 0 |
| 7 | 1 1 1 1 1 1 1 1 |

The foregoing code presents a relatively simple and facile mechanism for determining maxima and minima, employing only a "compare" unit.

As has been stated hereinabove and also in accordance with the invention, there is also provided an arrangement whereby an interaction controller can seize control of the bus if the bus is in the available state and if two or more interaction controllers simultaneously attempt to seize the bus, the conflict is resolved in favor of the interaction controller having the highest index number.

In the above connection, each controller is provided with its own fixed, unique seizure code which is a unique 8 bit binary number containing exactly 4 "0's" and 4 "1's." In the same cycle in which it sends its seizure code, an interaction controller reads the bus and compares the signal received therefrom with its own seizure code. If the latter signals are equal, such situation indicates that no other controller has attempted to seize the bus and that the controller attempting to seize the bus has, in fact, obtained command of the bus. However, if the latter signals are not equal, then a tie exists which has to be broken.

To break a tie when it occurs, the controllers involved in the tie employ their indices. As has been shown, an index suitably consists of two bytes, each of which consists of an initial string of 1's (at least one) followed by all 0's (possibly none). These indices are also suitably chosen to be octal digits and the tie is broken in favor of the contesting controller with the highest index number. In the cycle after the tie is detected, each controller involved sends the first byte of its index and compares the bus signal with this byte. If the controller finds inequality, then a byte with more initial 1's has been sent, i.e., one of the other tied controllers has a larger index number. Therefore, if the controller does find inequality, it sends no further signals until it is so bidden, notes that the bus is unavailable, and awaits a later opportunity to seize the bus. If it finds equality, then on the next cycle, it sends its second index byte and compares the bus signal with this byte. Here again if it finds inequality, it yields the bus but if it finds equality, it has gained control of the bus. With this arrangement, ties can be broken employing an equality detector, i.e., the aforementioned compare unit.

In accordance with the invention, there is also provided an arrangement which also enables a "COUNT OFF" operation. In the latter operation, a controller having control of the bus can address all of the other controllers to interrogate them as to which and how many of them are working on the same job as the controller commanding the bus. The arrangement operates in this situation such that all of the controllers working on a given job first respond but only that controller with the highest index number is counted. In a second response from the controllers, the one found to have the highest index number in the first response is omitted. Thus, for example, if there were three controllers, other than the controller having command of the bus, working on the same job, all three would respond in a first response. A second response would include the two controllers with the lowest index numbers and a third response would include only the controllers with the lowest index number. In a fourth response, there would be no controllers responding. In other words, the bus code would be all 0's.

In considering various details of operation of the structures comprising the inventive arrangement, each interaction controller is arranged to be capable of gating signals onto the interaction bus. In principle, the bus is simply a set of conductors; however, as a practical matter, equipment such as amplifiers may be required to provide the proper electrical characteristics. Accordingly, the bus can be regarded as a dot-OR device. The bus may be timed with synchronous signals or it may be asynchronous with appropriate timing considerations introduced by each controller in order to provide the same total effect.

Conveniently, each bus cycle may be divided into three intervals. During the first and second intervals, any signals to be sent are continuously gated onto the bus. During the second interval, the signals are read from the bus, the first interval being chosen to be long enough to permit the signals to stabilize. During the third interval, the units decide what message, if any, is to be sent to the next succeeding cycle.

Figure 2:
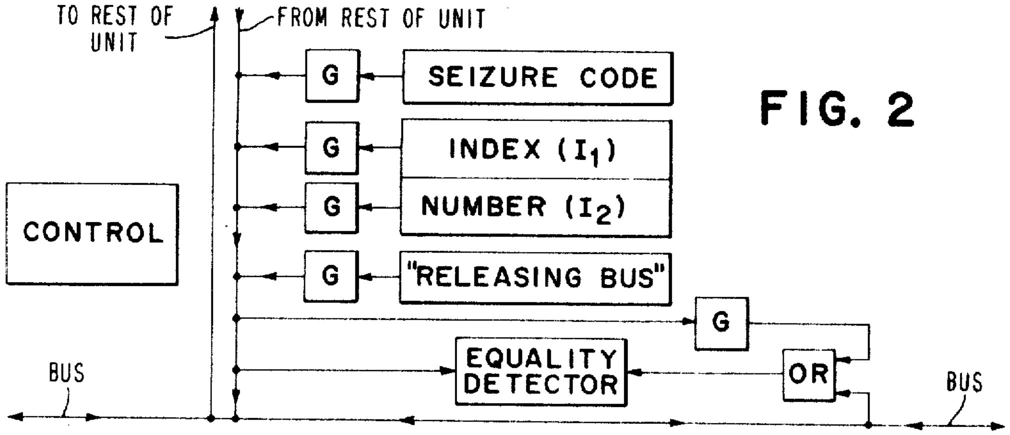
FIG. 2 is a block diagram of an illustrative embodiment of an interaction control unit constructed in accordance with the principles of the invention.

Referring now to FIG. 2, there is shown therein a depiction of the structure required in an interaction controller according to the invention. It is noted therein that there is not required the capability of directly determining the larger of two encoded numbers but merely an equality detector. In considering the arrangement in FIG. 2, let it be assumed that the bus is one byte, the byte comprising 8 bits in addition to any timing bytes and that there are more than 8 but not more than 64 interaction controllers. Each interaction controller has two fixed quantities associated with it, viz., a unique seizure code which is 1 byte long and contains 4 "0's" and 4 "1's" and a unique index code consisting of 2 bytes, each of the latter having an initial string of 1's (at least one) followed by all zeros (perhaps none). As we have mentioned hereinabove, this index is considered as being a number expressed from 2 octal digits.

There is also a common one bit word which all units interpret as a "RELEASING BUS" signal.

Figure 3:
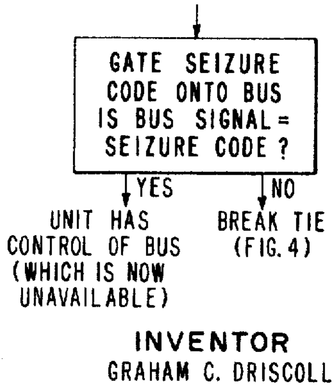
FIG. 3 is a conceptual depiction of the operation of an interaction controller in its attempt to seize command of the common bus.

At any given moment, either the bus is available or it is under the command of one interaction control unit. In FIG. 3 there is shown how a unit attempts to gain control of the bus. If there is a tie, a given unit succeeds in gaining control only if it is the winner in the tie-breaking operation.

Figure 4:
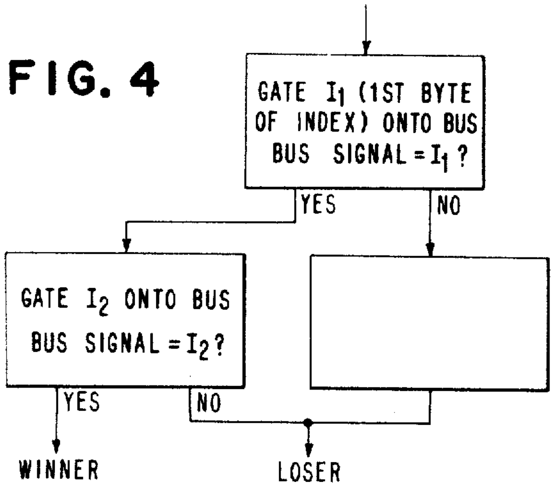
FIG. 4 is a conceptual depiction of the mechanism according to the invention as to how a tie is broken in awarding command of the bus to one of a plurality of contesting interaction control units.

FIG. 4 is a conceptual depiction of the tie-breaking operation. Each box of FIG. 4 represents a bus signal. The empty box indicates that the unit takes no action during that cycle. It is to be noted that the disjunction of several seizure codes is chosen to contain at least five 1's and consequently is inequal to any seizure code. Also, disjunction of several index bits is equal to the one with the most leading 1's, i.e., to the one encoding the largest octal digit. Thus, a tie is decided in favor of the unit with the largest index.

Figure 5:
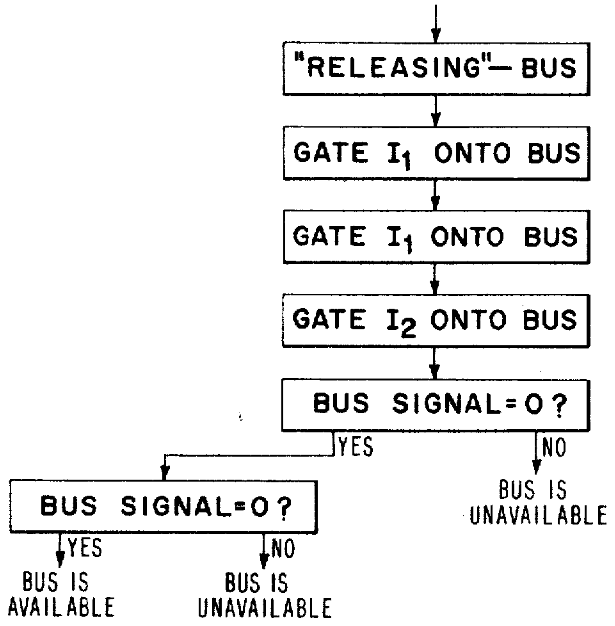
FIG. 5 is a flow diagram which indicates the sequence gone through when an interaction control unit in command of the bus releases the bus when it no longer needs control thereof.

In FIG. 5 there is shown a flow chart which indicates how an interaction controller releases the bus when it no longer requires command thereof. In this connection, the latter controller sends its own index bits in order to allow controllers seeking control to arrange themselves into two classes, viz., those with lower indices and those with higher indices.

Figure 6:
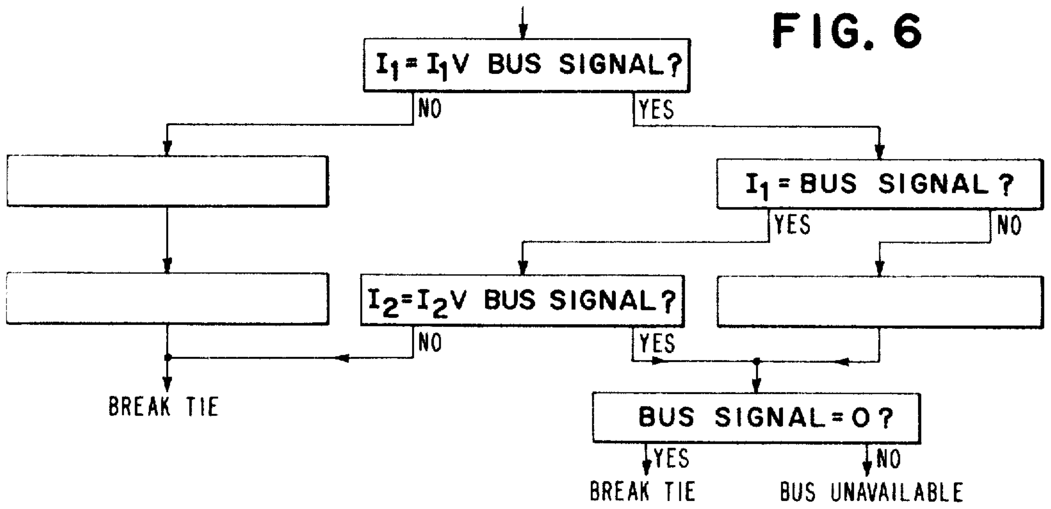
FIG. 6 is a flow diagram indicating the sequence undergone when an interaction control unit wanting the bus which has been unavailable reacts when a bus releasing signal is transmitted.

The flow chart depicted in FIG. 6 illustrates how a controller seeking control of the bus which has been theretofore unavailable reacts when the "RELEASING BUS" signal has just been sent. If it has a lower index than the releasing controller, it proceeds immediately to break the tie (although in fact it may be the only such unit). If it has a higher index, it yields to those with the lower indices.

If there are none, it proceeds to break the tie. Thus, control of the bus is passed to the requestor with the next lower index number, if any, and otherwise to the requestor with the highest index number.

It can readily be appreciated that it is relatively simple to use comparison circuitry to select those controllers which are to receive the message. The controller in command of the bus can specify what quantity each controller is to compare with the bus signal on the next cycle and whether it is those finding equality or those finding inequality which is to receive the message. Thus, the sending unit does not itself have to select units to which its message is to go but instead a "to whom it may concern" type of communication is enabled.

Since the tie-breaking arrangement enables the finding of the maximum index, the maximum of any set of numbers so encoded can be found within a unit and by using the complements of these numbers, the minimum of the set can be found.

Figure 7:
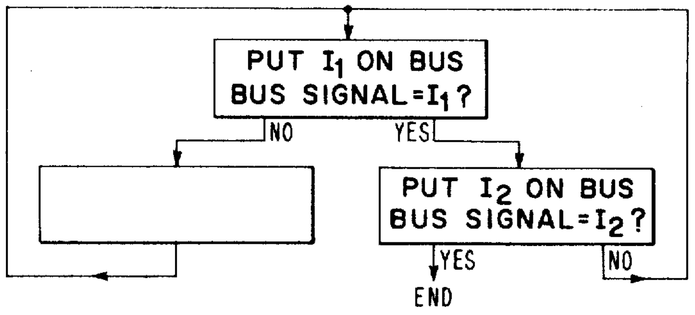
FIG. 7 is a flow diagram conceptually depiciting the "count off" operation, according to the invention.

FIG. 7 is a flow chart depicting the "COUNT OFF" operation. Thus, if the controller in control of the bus causes the selected controllers to operate as shown in FIG. 7, it can determine how many of them there are, viz., half as many as the number of cycles during which the bus is in the non-zero state after the controller in command of the bus has caused them to start counting off.

Figure 8:
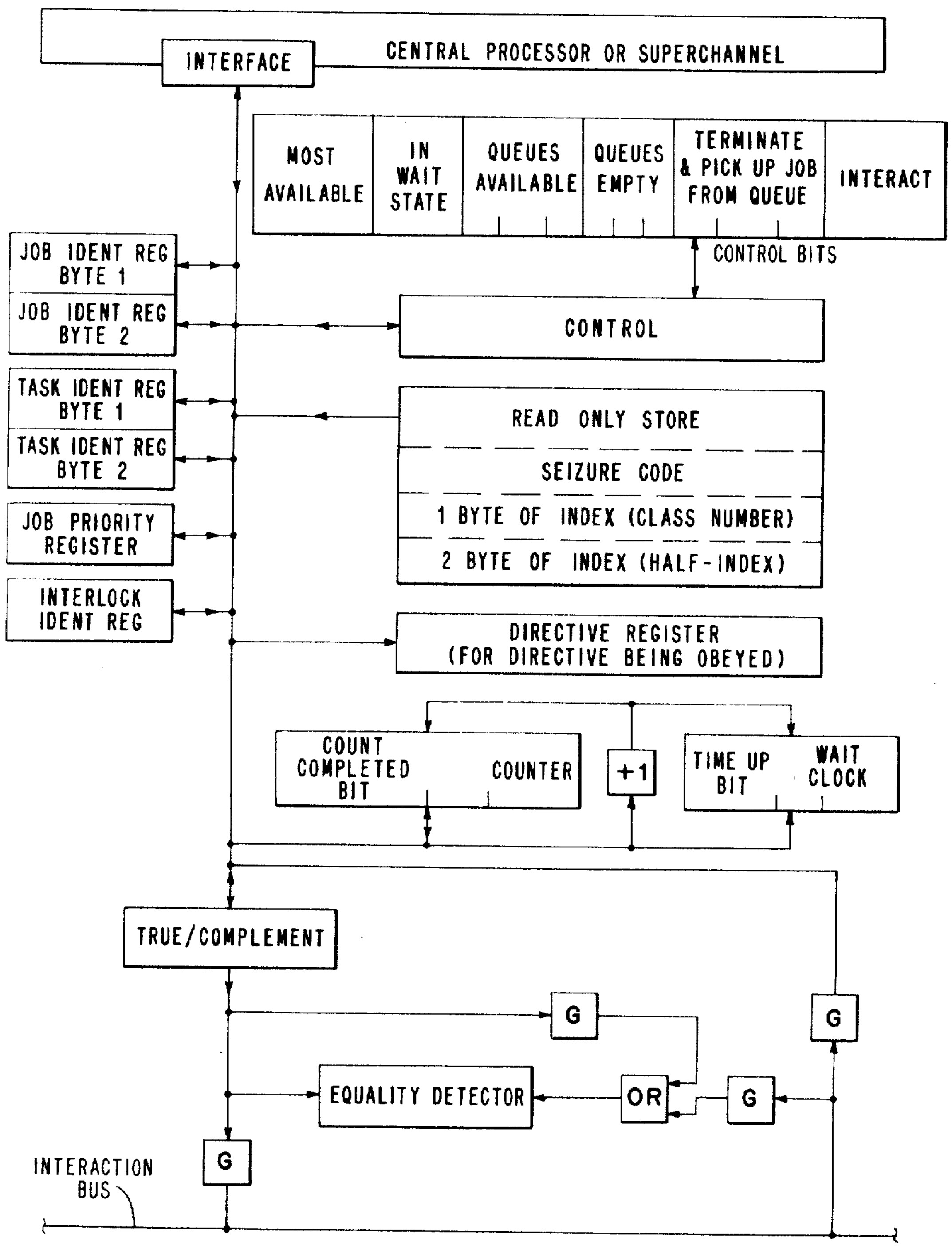
FIG. 8 is a diagram similar to that of FIG. 2 showing further structures included in the interaction control unit and depicting the data paths therein.
Figure 9A:
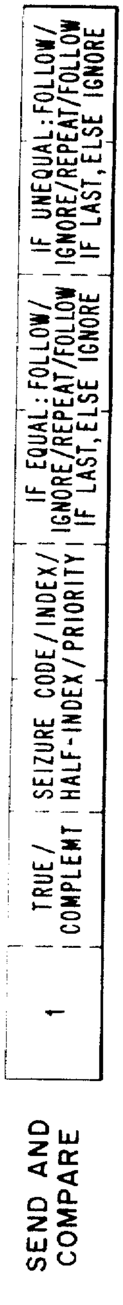
FIGS. 9A–9I are respective depictions of directive sets explanatory of the operation of the invention.
Figure 9B:
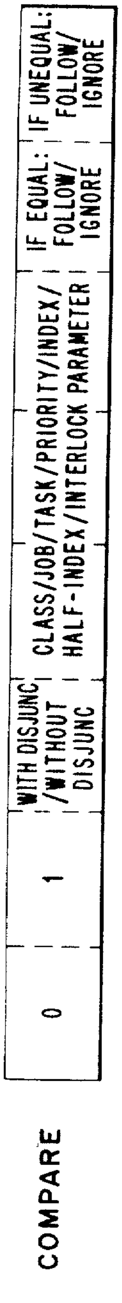
Figure 9C:
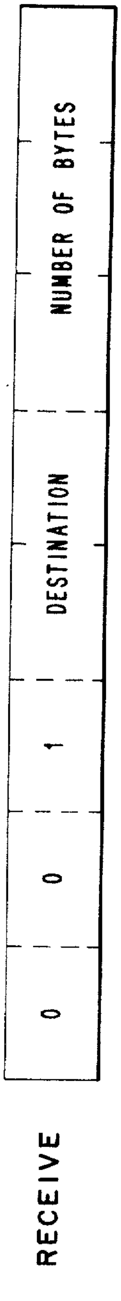
Figure 9D:
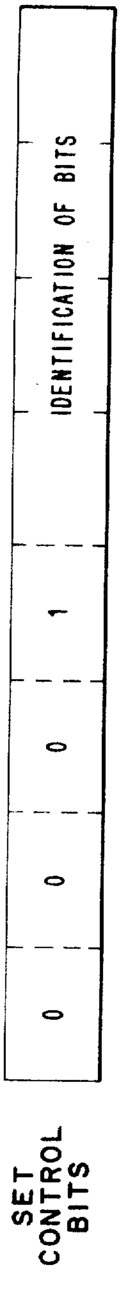
Figure 9E:
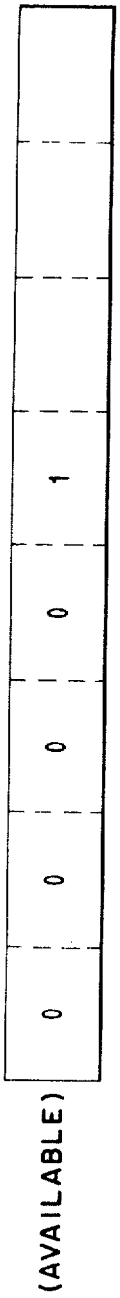
Figure 9F:
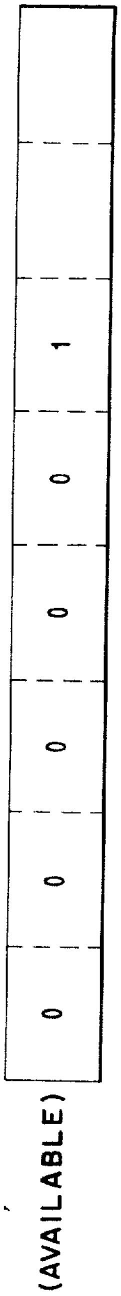
Figure 9G:
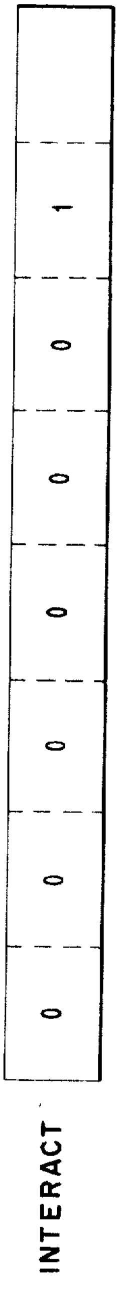
Figure 9H:
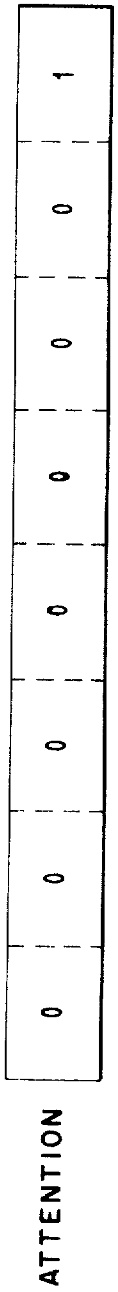
Figure 9I:
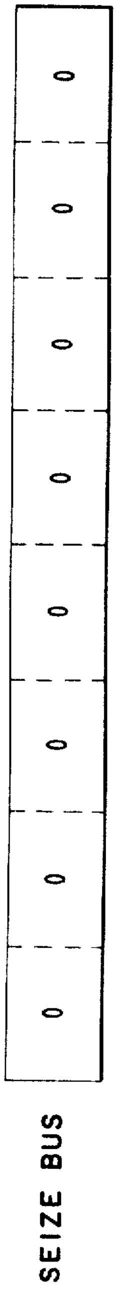

FIG. 8 shows the data paths in an interaction controller in accordance with the invention. In FIG. 8, the "WAIT" clock is suitably employed to limit the time that a processor or channel spends in the "WAIT" state.

The control bits are employed to contain the information needed for the interaction operations and to transmit orders. If, for example, the interaction controller of a given central processor sets the "terminate and pick up from interruption queue" bits to 1, then the processor would finish its current instruction execution, dump its current task, pick up the first interruption task listed, and reset the last-named bit and the "most available" bit to zero. The resetting of these bits would cause the controller to execute the sequence to select a new most-available unit.

FIGS. 9A through 9I show a directive set utilized in accordance with the invention. In this set, the term "follow" employed therein is meant to signify that a controller is to obey the succeeding directive by "ignoring," i.e., that it is to ignore all directives until it reaches either an "ATTENTION" or a "SEIZE BUS" ("RELEASING BUS") directive. The term "half by index" is intended to designate the second byte of the index and is all that need be used in breaking the tie among controllers which belong to the same class, if that class is not the central processor class. The "ATTENTION" directive causes all controllers to stop ignoring directives. It enables a controller having command of the bus to select some controllers and cause them to take some action, then after sending the "ATTENTION" directive to select some other controllers and cause them to take some other action. If a controller has been directed by a "SEND & COMPARE" directive to send a two-byte quantity, i.e., its index, then it sends the second byte only if it found equality when sending the first byte. If it found inequality on the first byte, it skips the next cycle and then takes the action specified for inequality. The "follow if last, else ignore" option is implemented by the controllers' comparing the bus signal with zero on the next cycle after finding equality for both bytes of its index successively. If the cycle is zero, the controller was last and it follows the next directive. Otherwise, the controller was not last and ignores succeeding directives. This option enables one to count the number of controllers meeting chosen criteria and at the same time to select one of them.

If a "COMPARE" specifies "with disjunction," then the controller compares the specified quantity with the "inclusive" OR of that quantity and the bus signal. Otherwise, the comparison is between the quantity and the bus signal.

The "INTERACT" causes a control bit to be set to "1" after the instruction has been received on succeeding bus cycles. In this connection, when the "INTERACT" bit is set by the controller for a central processor, the processor finishes the execution of its current instruction and then executes the instruction which was sent over the interaction bus and then resets the "interact" bit to "0." The latter instruction may be any one in the instruction set, including an "EXECUTE" instruction. If it is not an "EXECUTE" or a branch or supervisor call, i.e., equivalent to an interruption, then after its execution, the processor continues with the next instruction in the sequence it was following when the "INTERACT" bit was changed to 1.

The second half of the "SET CONTROL BITS" directive specifies the bits and the value, for example, it specifies the "time-sharing queue empty" bit to 0. The bits which can be specified are the "most available" bit and all of the "queue available," "queue empty" and "terminate and pick up" bits. In addition, as space in the directive permits, frequently used combinations are specified in a single directive. An example of such combination is "interruption queue available" and "interruption queue empty."

Figures 10, 10A:
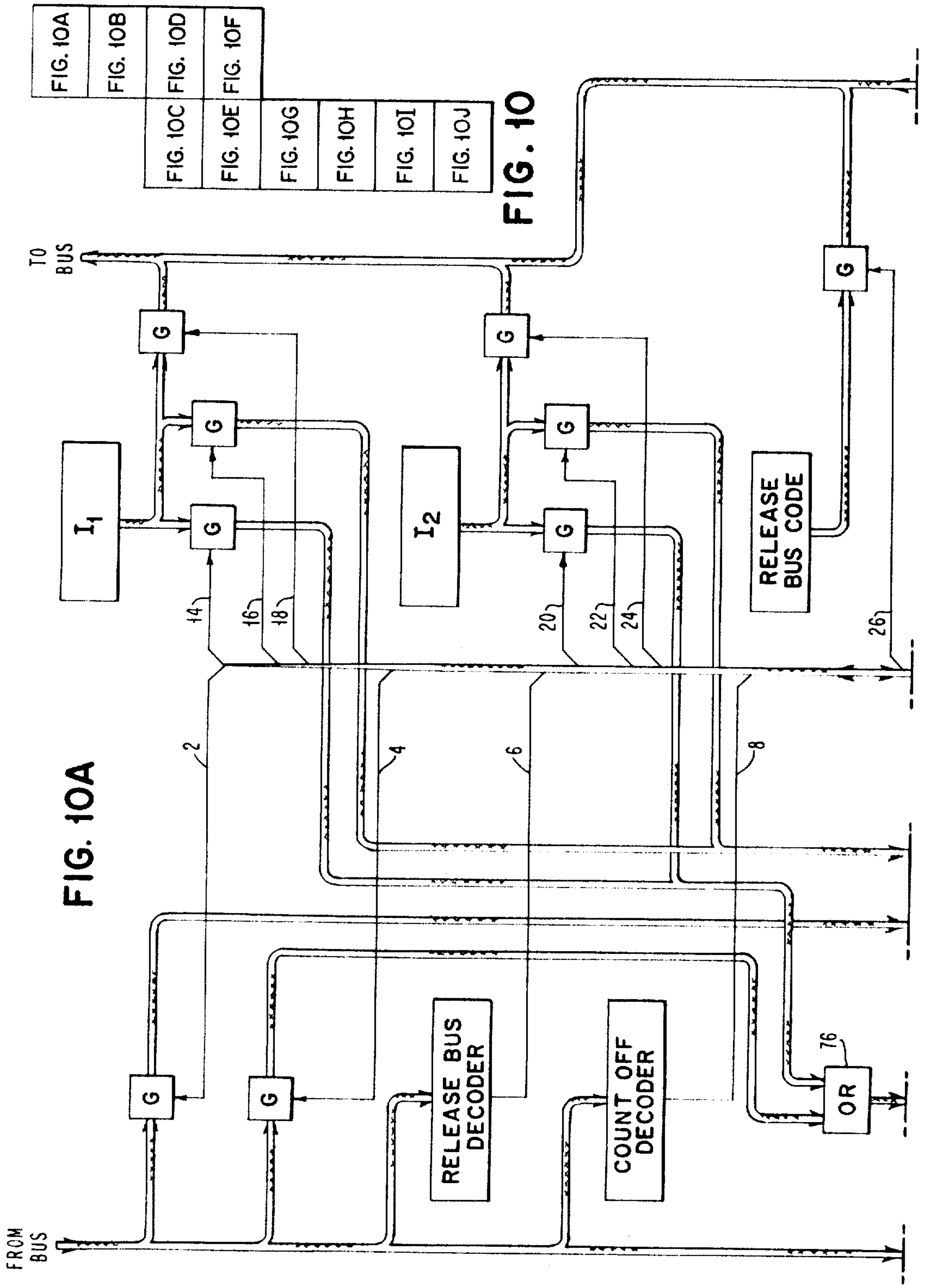
FIGS. 10A–10J, taken together as in FIG. 10, constitute a diagram of an illustrative embodiment of an interaction control unit constructed according to the invention.
Figure 10B:
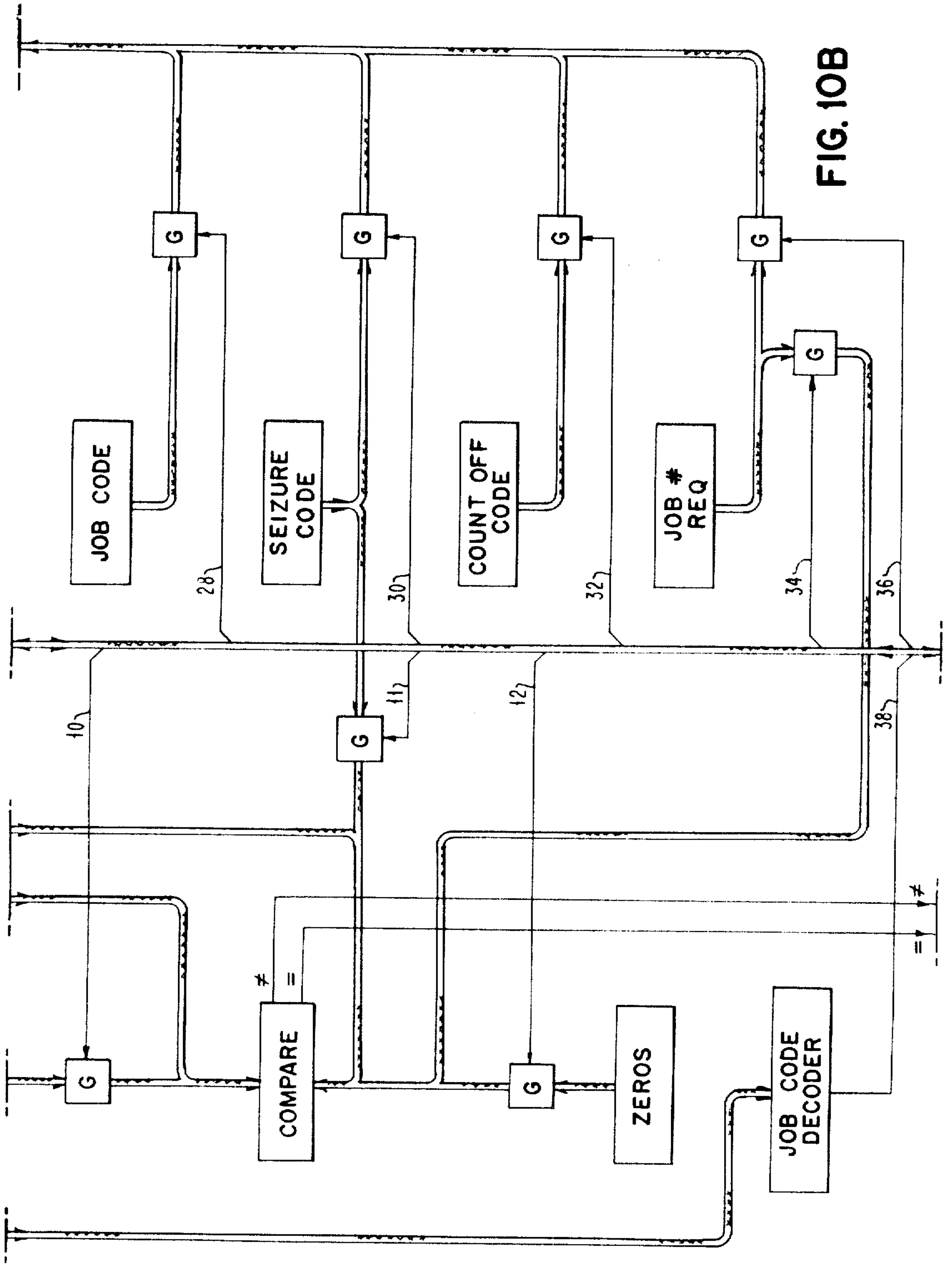

This reference is now made to FIGS. 10A–10J, taken together as in FIG. 10, wherein there is depicted an illustrative embodiment of a control unit constructed in accordance with the principles of the invention. The embodiment shown in FIG. 10 is illustrated as synchronously operated and to this end the circuits contained therein are operated by the A, B, C, and D pulses shown in the pulse trains of FIGS. 11A–11D respectively, FIGS. 11A–11D collectively forming the timing diagram of FIG. 11. The pulse trains of FIG. 11 are applied to all interaction controllers. The A pulses are used to place information on the interaction bus. The B pulses are employed to read the bus after the bus has stabilized and the C and D pulses are utilized for control purposes.

Figures 13, 13A:
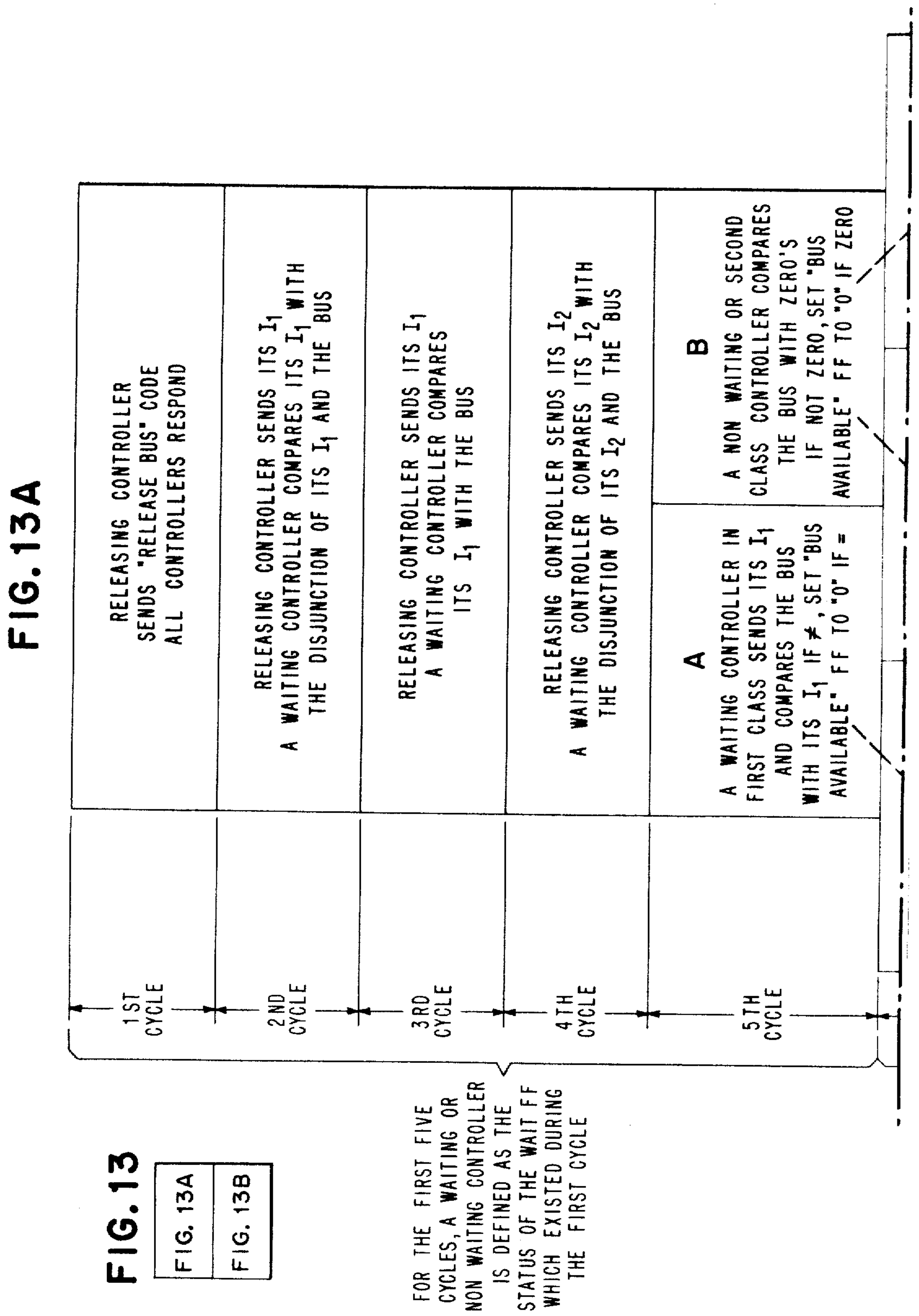
FIGS. 13A and 13B, taken together as in FIG. 13, are a flow diagram of the machine cycles gone through in the operation of the invention.
Figure 13B:
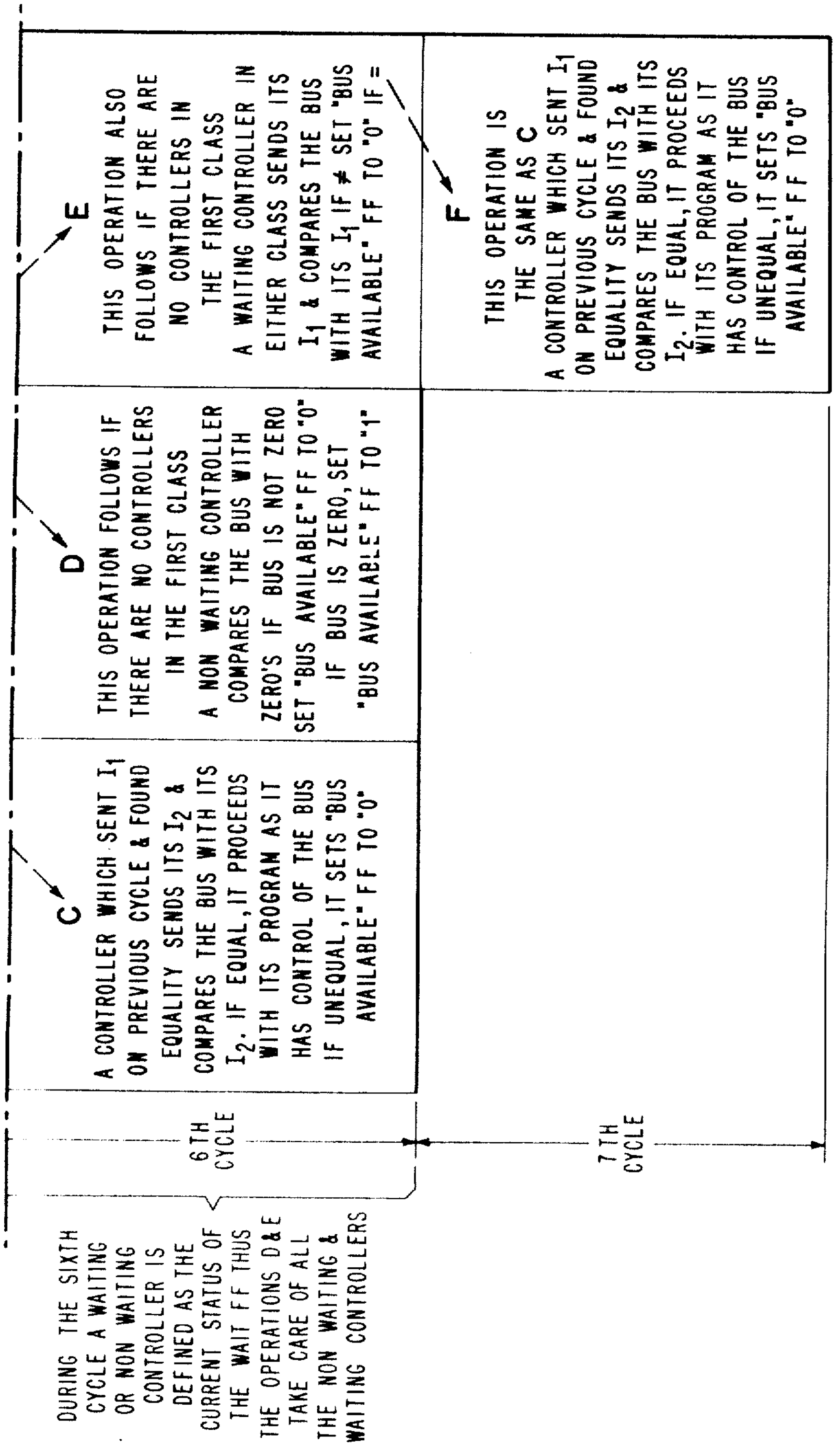

The first sequence of operation that is described is the "Release Bus" sequence, the latter sequence being shown in flow chart form on FIGS. 13A and 13B, which are taken together as shown in FIG. 13. It is noted that this sequence always employs at least six machine cycles and sometimes seven. Each interaction controller has to enter into this sequence although only the releasing and waiting controllers perform operations during the first four cycles. In the fifth cycle, a non-waiting controller as well as a waiting controller perform operations. Consequently, it is necessary for each non-waiting controller to keep track of the sequence in order to perform in the fifth and sixth machine cycles. In this latter connection, a releasing controller is also considered a non-waiting controller.

Figure 10C:
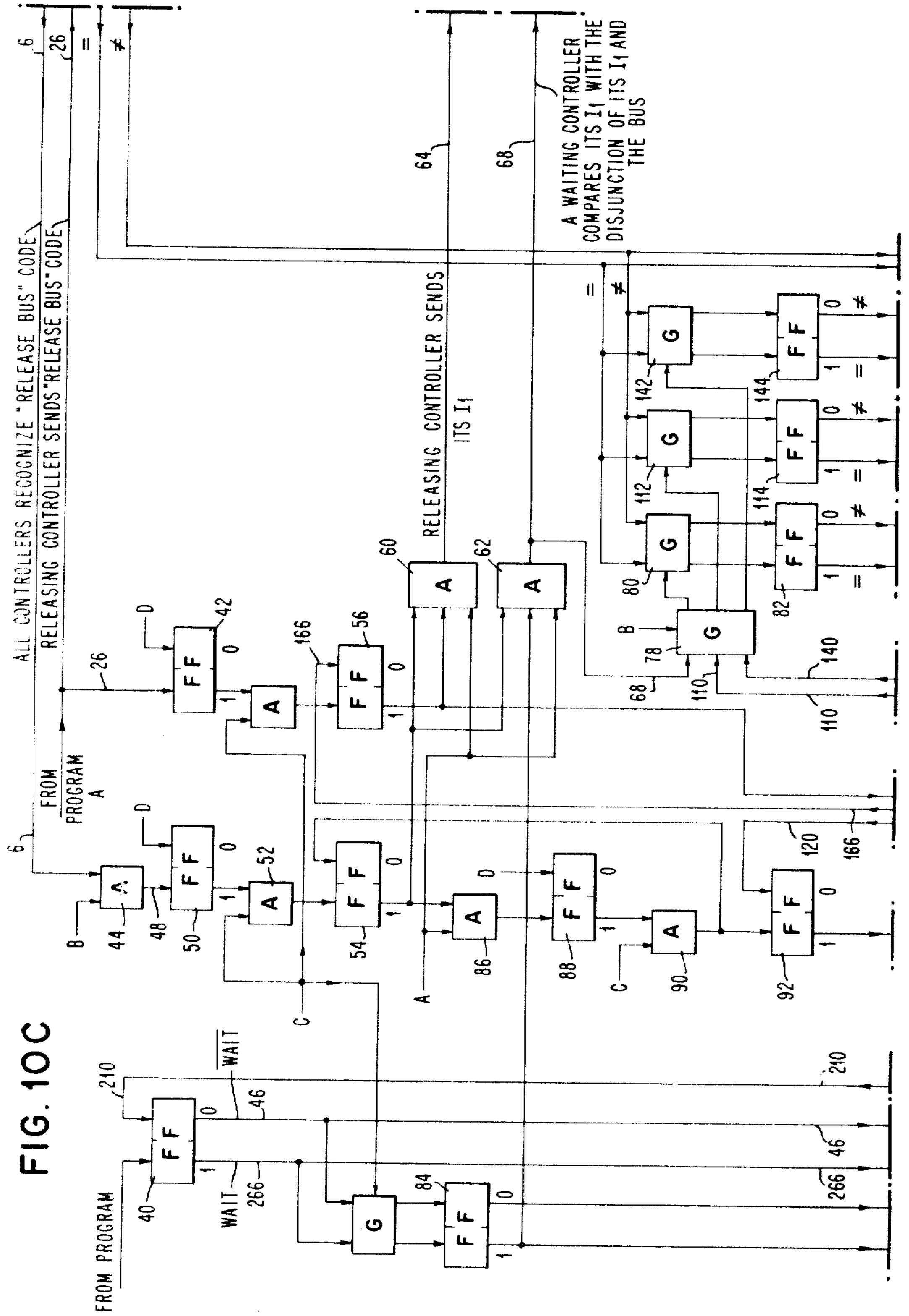
Figures 11, 11A, 11B, 11C, 11D:
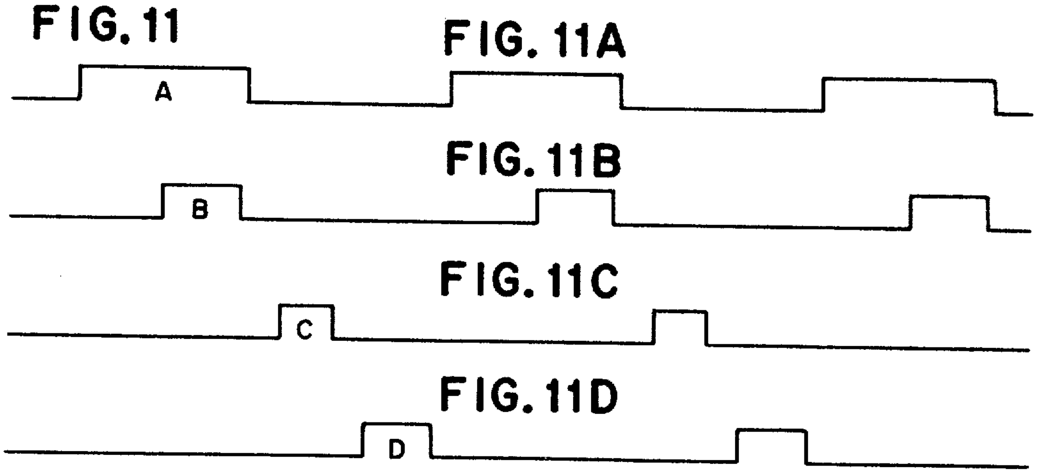
FIG. 11 is a timing diagram of synchronizing pulse train waveforms utilized in the invention, the waveforms being designated 11A–11D respectively.

Referring to FIG. 10, the releasing controller applies an A pulse to line 26 which is effective as shown in FIG. 10C to gate the "release bus" code to the bus. A flip-flop 42 (FIG. 10C) is set to "1." Flip-flop 42 is employed to control the sequence of machine cycles in the releasing controller. Line 6 (FIGS. 10A, B and C) becomes active in all controllers since all of the controllers recognize the "release bus" directive which is on the bus. Line 6 connects to an AND circuit 44 which is enabled by a B pulse to set a flip-flop 50 (FIG. 10C) to the "1" state. Flip-flop 50 is set to the "1" state in all interaction controllers and, in the releasing controller, flip-flop 42 is also set to the "1" state. The set output of flip-flop 50 is effective to enable an AND circuit 52 whereby a C pulse can set a flip-flop 54 to the "1" state, transfer the setting of a flip-flop 40 to a flip-flop 84 and, in the case of the releasing controller, setting flip-flop 56 to the "1" state. A D pulse can now reset flip-flops 48 and 50 which signifies the end of the first machine cycle. The setting of flip-flop 54 insures the occurrence of the sequence of the next four machine cycles. In the releasing controller, flip-flop 56 is set to the "1" state and, because the releasing controller is also a non-waiting controller, flip-flop 84 is reset to the "0" state. In this connection, it is to be noted that in a waiting controller, flip-flop 84, at this juncture, is set to the "1" state. At the end of the first machine cycle, the settings in flip-flops 84, 54, and 56 are as indicated in the table immediately set forth hereinbelow.

| Controller | F.F. 84 | F.F. 54 | F.F. 56 |
|---|---|---|---|
| Releasing controller | 0 | 1 | 1 |
| Non-waiting controller | 0 | 1 | 0 |
| Waiting controller | 1 | 1 | 0 |

Figure 10D:
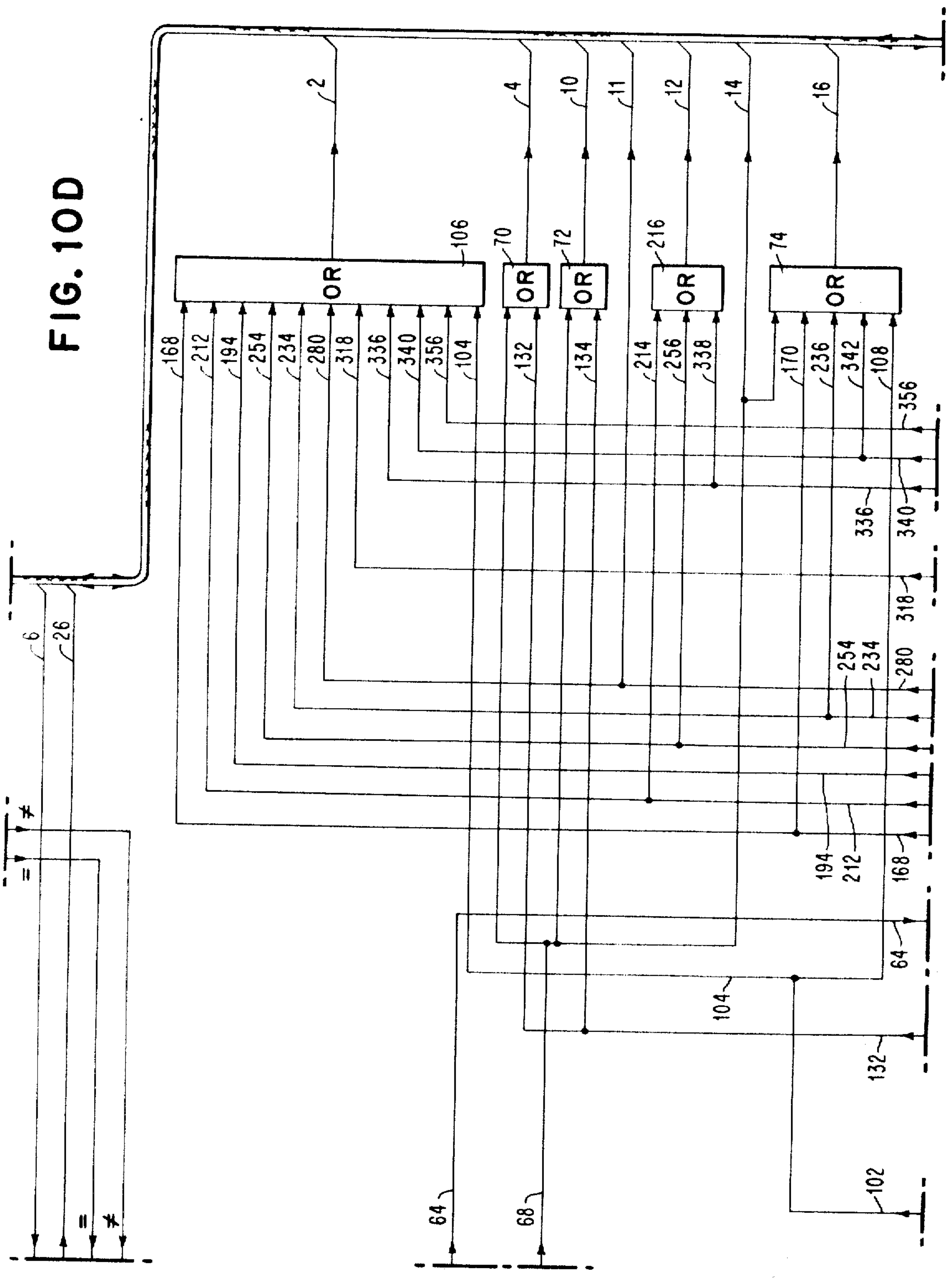

In the second machine cycle, during the A pulse time, an AND circuit 60 in the releasing controller is enabled and an AND circuit 62 (FIG. 10C) in a waiting controller is enabled. Circuit 60 produces an output on line 64 which is applied to an OR circuit 66 (FIG. 10F). The output of OR circuit 66 on a line 18 is effective to gate $I_1$ number of the releasing controller to the bus. In a waiting controller, AND circuit 62 produces an output on line 68 which is applied to an OR circuit 70 and an OR circuit 72, line 14, and OR circuit 74 (FIG. 10D). The output of OR circuit 70 appears on line 4 and is applied to gate $I_1$ number of a waiting controller to an OR circuit 76 (FIG. 10A). The output of OR circuit 72 appears on line 10 and is effective to gate the output of OR circuit 76 of a waiting controller to the compare unit (FIG. 10B). The output appearing on line 14 is effective to gate the $I_1$ number of a waiting controller to OR circuit 76. The output of OR circuit 74 which appears on line 16 is effective to gate the $I_1$ number of a waiting controller to the compare unit. At B pulse time in the second machine cycle, a gate 78 is enabled which permits the pulse on line 68 to enable a gate 80 (FIG. 10C). A flip-flop 82 is set to the "1" state if the output of the compare unit is equal and is reset to the "zero" state if the output of the compare unit is unequal.

Figure 12:
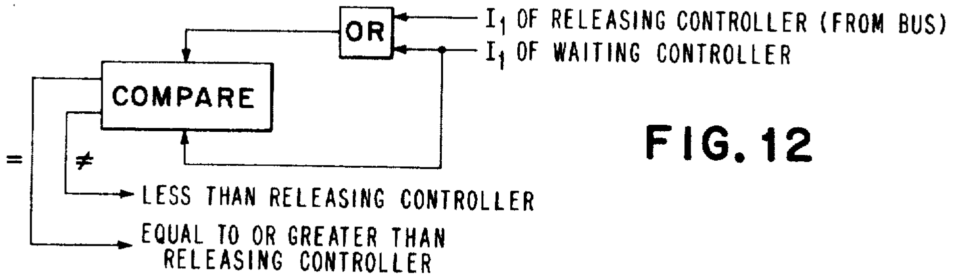
FIG. 12 is a logical diagram illustrating the operation of the "equality" or compare unit in the interaction control unit, according to the invention.

The gating immediately described hereinabove is depicted in FIG. 12.

A waiting controller in which the compare unit has an unequal output is definitely in the first class, or class of interaction controllers whose indices are less than that of the releasing controller, and it does not have to participate in the ensuing next two cycles. In the embodiment depicted in FIG. 10, the next two cycles are in fact gone through by such class waiting controller but the results thereof are disregarded. An example of the manner in which a determination is made during the second, third and fourth cycles, is shown in FIG. 14.

Figure 14:
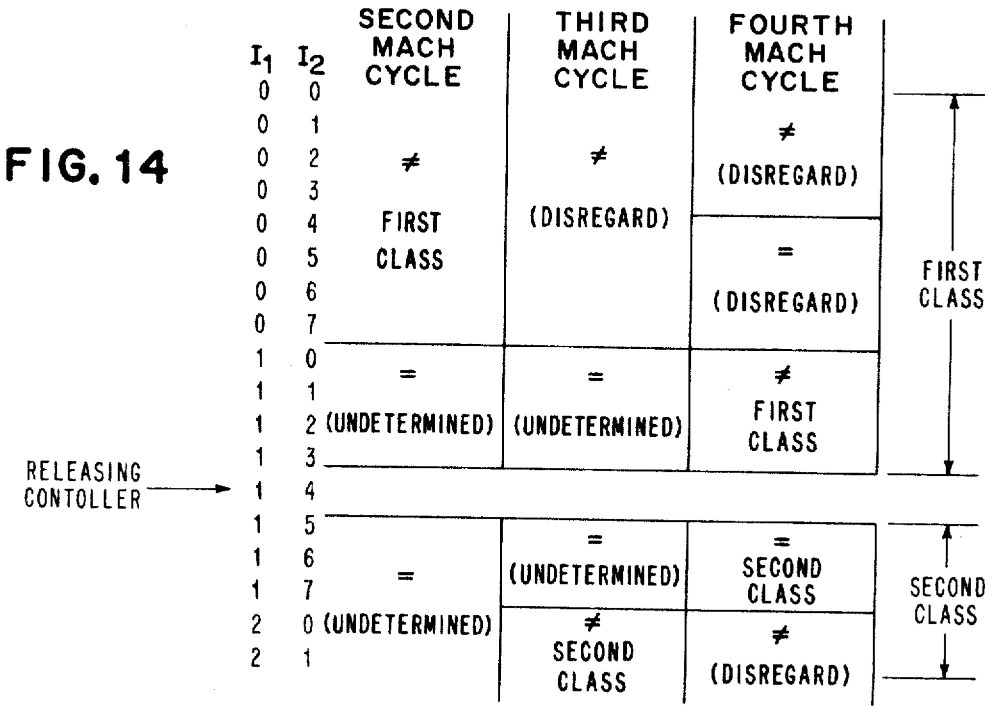
FIG. 14 is a chart depicting a portion of the machine cycle operation of interaction control units.

The chart depicted in FIG. 14 sets forth waiting controllers designated 00 (octal) to 21 (octal). In the examples shown in the chart, the releasing controller is designated 14 (octal). It is to be noted that in the second machine cycle any waiting controller having an index number $I_1$ equal to or greater than the index number $I_1$ of the releasing controller results in its compare unit delivering an = (equal) output. The controllers whose index numbers $I_1$ are less than that of the releasing controllers will have an ≠ (unequal) output. Therefore, at the termination of the second machine cycle the controllers designated 00–07 will be designated as being in the first class and those numbered 10–13 and 15–21 will be undetermined. In the third machine cycle, there is compared the index number $I_1$ of each waiting controller with the index number $I_1$ of the releasing controller. As shown in FIG. 14, interaction controllers having an octal number 20 and greater produce an ≠ (unequal) output and, accordingly, they definitely fall into a second class. Controllers 10–13 and 15–17 are still undetermined. Controllers 00–07 have an ≠ (unequal) output but this is disregarded by the system. In the fourth machine cycle, controllers that were considered undetermined during the third cycle are separated into the two classes.

Referring back to FIG. 10, in the second machine cycle, the A pulse which had been applied to the AND circuits 60 and 62 (FIG. 10C) is also applied to an AND circuit 86. The "1" setting of flip-flop 54 is transferred to flip-flop 88. At C pulse time in the second machine cycle, an AND circuit 90 is enabled and the "1" setting of flip-flop 88 is transferred to a flip-flop 92. A D pulse in the second machine cycle is then effective to reset flip-flop 88 to the "0" state.

Figure 10E:
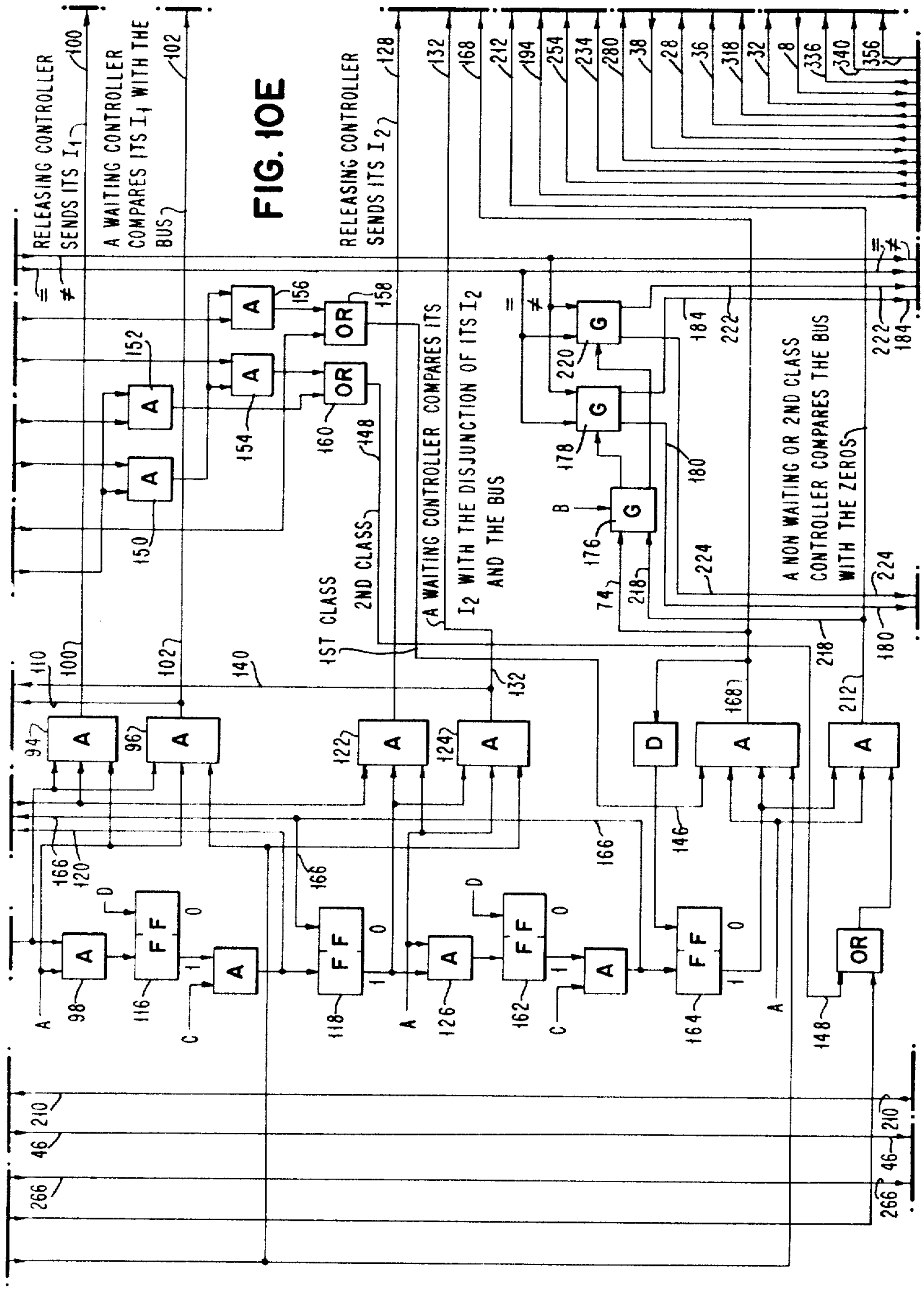
Figure 10F:
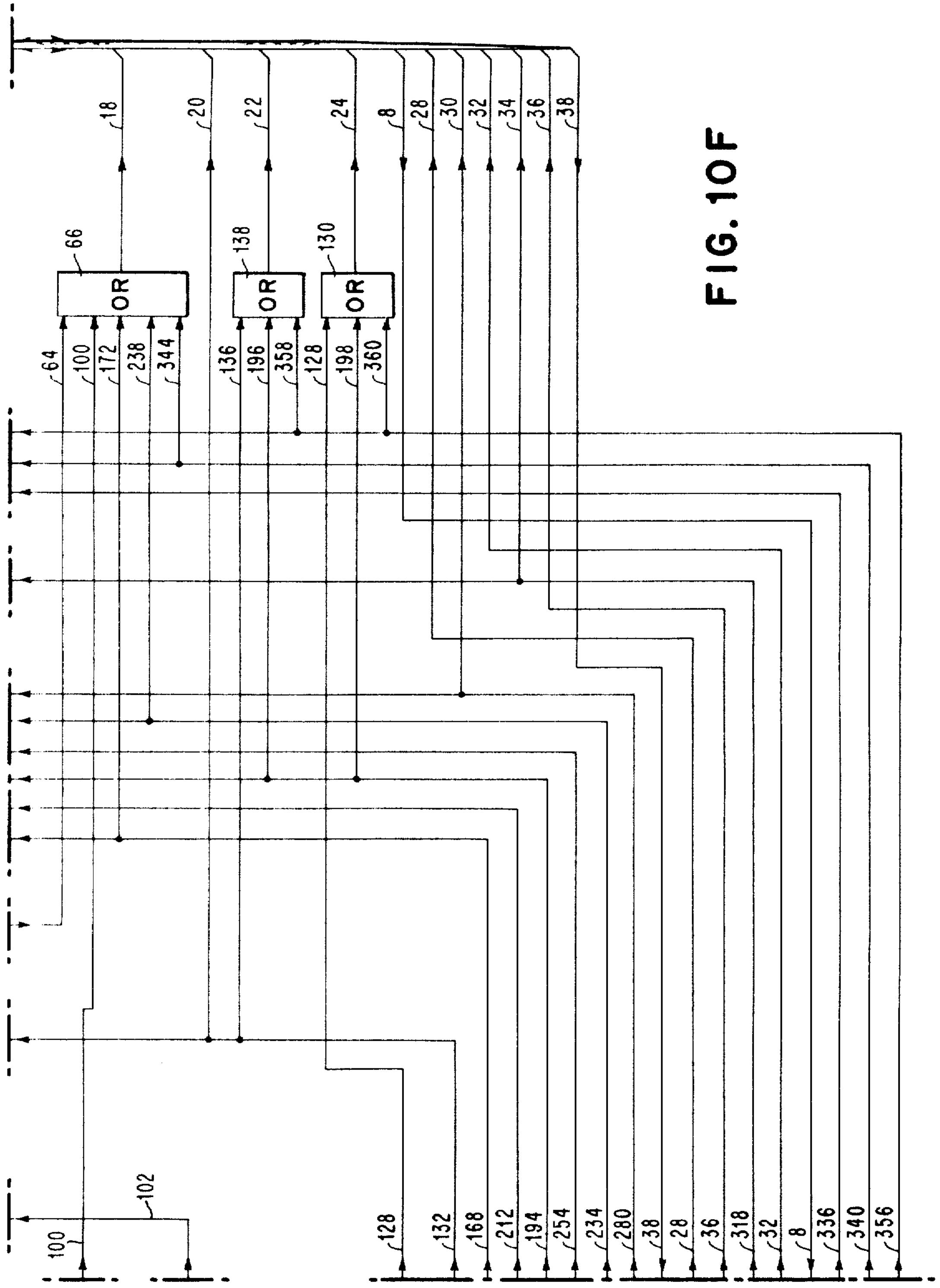

In the third machine cycle, an A pulse is applied as one input to AND circuits 94, 96 and 98 (FIG. 10E). In a releasing controller, line 100 is activated whereby the output thereon is applied to an OR circuit 66 (FIG. 10F). The output of OR circuit 66 appearing on line 18 is effective to gate the index number $I_1$ of the releasing controller to the bus.

In a waiting controller, line 102 (FIG. 10E) becomes active and branches to line 104 (FIG. 10D), the output on line 104 being applied to an OR circuit 106. The output of OR circuit 106 appears on line 2 and is effective to gate the bus setting to the compare unit (FIG. 10B). Line 102 also branches to line 108 (FIG. 10D), the output on line 108 being applied to OR circuit 74. The output of OR circuit 74 functions to gate the index number $I_1$ of a waiting controller to the compare unit. The output appearing on line 102 is applied through a line 110 (FIG. 10C) to a gate 78 at B pulse time to enable a gate 112. With this arrangement, the output of the compare unit is thus permitted to set a flip-flop 114.

The A pulse applied to an AND circuit 98 transfers the setting of a flip-flop 92 (FIG. 10C) to a flip-flop 116 (FIG. 10E). A C pulse in the third machine cycle then transfers the setting of flip-flop 116 to a flip-flop 118 and the same C pulse is effective via lead 120 to reset flip-flop 92. The set output of flip-flop 118 is applied as an input to each of AND circuits 122, 124 and 126.

In the fourth machine cycle, an A pulse, applied to AND circuit 122 of a releasing controller causes a line 128 to become active, the output on line 128 being applied to an OR circuit 130 (FIG. 10F). The output of OR circuit 130 appears on line 24 and is applied to gate the index number $I_2$ of a releasing controller to the bus. In a waiting controller, line 132 would become active in such situation. The output on line 132 is applied to OR circuit 70 (FIG. 10D) whose output appears on line 4 and is employed to gate the bus setting to an OR circuit 76 (FIG. 10A). Line 132 branches to lead 134, the output appearing on lead 134 being applied to OR circuit 72 (FIG. 10D). The output of OR circuit 72 appears on line 10 and is used to gate the output of OR circuit 76 (FIG. 10A) to the compare unit (FIG. 10B). Line 132 also branches to a lead 20 (FIG. 10A), the output appearing on lead 20 being applied to gate the index number $I_2$ of a waiting controller to OR circuit 76. Lead 132 also branches to a lead 136 (FIG. 10F), the output appearing on lead 136 being applied to an OR circuit 138, the output of OR circuit 138 appearing on line 22 and being employed to gate the index number $I_2$ of a waiting controller to the compare unit. With the arrangement described immediately hereinabove, the index number $I_2$ of a waiting controller is compared with the disjunction of its index number $I_2$ and the bus setting.

As shown in FIG. 10C, lead 132 branches to lead 140. When lead 140 is in the active state, such state extends through gate 78 at B pulse time in the fourth machine cycle and enables a gate 142. The output of the compare unit is effective to set a flip-flop 144. The operation of separating the waiting controllers into the two classes as exemplified by the chart in FIG. 14 and by the first four machine cycles as depicted in FIG. 13 is now completed. From an examination of FIG. 10D, it can be seen that, if line 146 is active, a waiting controller is in the first class, and that if line 148 is active, that the waiting controller is in the second class. The AND circuits 150, 152, 154, 156, and the OR circuits 158 and 160 effectively provide a steering circuit which accomplishes the proper separation into one of the two classes.

When the A pulse was applied to an AND circuit 126

(FIG. 10D) in the fourth cycle, it transferred the setting of a flip-flop 118 to a flip-flop 162. A C pulse in the fourth machine cycle then transfers the setting of flip-flop 162 to a flip-flop 164. This same C pulse is effective on lead 166 to reset flip-flop 118 and to reset flip-flop 56. Flip-flop 56 is reset at this time because the releasing controller has completed its function.

As indicatd in FIG. 13, two operations occur concurrently in the fifth cycle. Thus, at A pulse time, in a waiting controller of the first class, line 168 (FIG. 10E) becomes active whereby the output appearing thereon is applied as one input to an OR circuit 106 (FIG. 10D) whose output appears on line 2. The output of OR circuit 106 is utilized to gate the bus setting to the compare unit. Line 168 branches to a lead 170, the output appearing on lead 170 being applied as an input to OR circuit 74 (FIG. 10D). The output of OR circuit 74 on line 16 is employed to gate the index number $I_1$ to the compare unit. Line 168 also branches to line 172, the output appearing on line 172 being effective through OR circuit 66 (FIG. 10F) and line 18, to gate index number $I_1$ to the bus.

As shown in FIG. 10E, line 168 branches to line 174 and, at B pulse time, the output on line 174 passes through a gate 176 and enables a gate 178. If the compare unit finds equality, a line 180 becomes active to set a flip-flop 182 (FIG. 10G) to the "1" state. If the compare unit does not find equality, a line 184 (FIG. 10G) becomes active to reset the "Bus Available" flip-flop (FIG. 10H) to the "0" state through an OR circuit 186. Thus, if the compare unit finds inequality, it is indicated that the index number of the controller is not the highest one, of the first class. If the compare unit finds equality, then it is indicated that there remains a chance that the controller may be the one with the highest index number of the first class and thereupon the controller proceeds to the next cycle to have its index number $I_2$ checked with that of any other controller that may also have found equality in the fifth cycle.

A waiting controller in the first class that had found equality in the fifth cycle would proceed to operation C (FIG. 13B) in the sixth cycle. Such functioning is made possible by the setting of flip-flop 182 (FIG. 10G) to the "1" state as described hereinabove. At C pulse time in the fifth cycle, the setting of flip-flop 182 is transferred to flip-flop 188. This permits a line 190 to become active at A pulse time in the sixth cycle. The active condition of line 190 extends through an OR circuit 192 to line 194 which extends to an OR circuit 106 (FIG. 10D). The output of OR circuit 106 appears on line 2 (FIG. 10D) to gate the bus setting to the compare unit. Line 194 branches to line 196 (FIG. 10), the ouput on line 196 being effective through an OR circuit 138 and a lead 22 (FIG. 10F) to gate the index number $I_2$ to the compare unit. Another lead branching from line 194 is a line 198, the output on line 198 being effective through an OR circuit 130 (FIG. 10F) and a lead 24 to gate the index number $I_2$ to the bus.

Figure 10G:
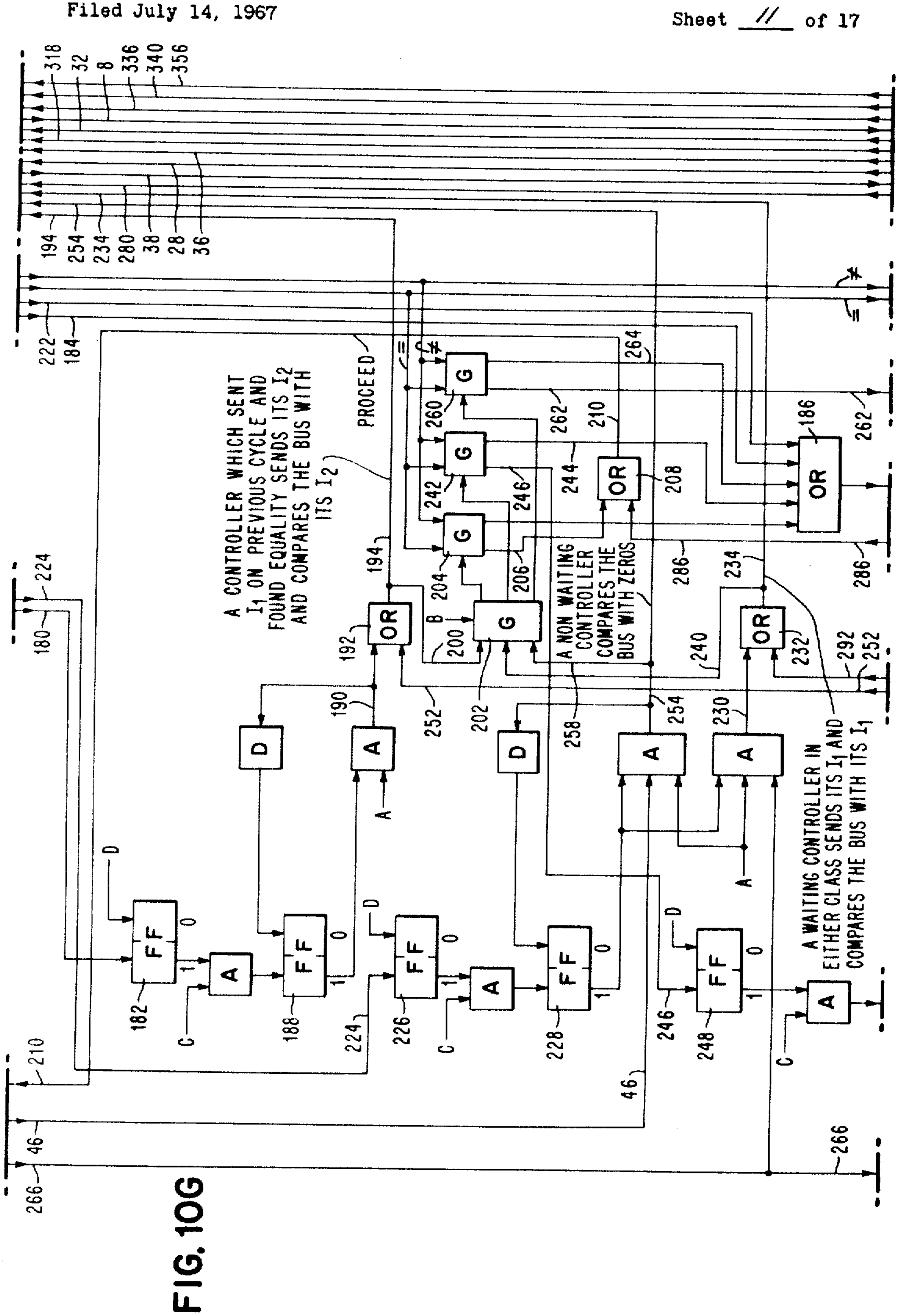

As seen in FIG. 10G, line 194 branches to a line 200, the output appearing on line 200 being effective at B pulse time to enable a gate 204 through a gate 202. At this juncture, the controller that finds equality ascertains that it has won any existing tie because a line 206 becomes active. Line 206 extends to an OR circuit 208 to a line 210, the output appearing on line 210 being employed to reset "Wait" flip-flop 40 (FIG. 10C) back to the "0" state. Such resetting is a signal to the controller to proceed with its program.

Referring back to the fifth cycle (FIG. 13A), it is noted therein that an operation B goes on concurrently with operation A as already described hereinabove. Operation B can succeed only if there are no leading controllers of the first class. In operation B, a line 212 becomes active (FIG. 10E). Line 212 extends to line 2 via OR circuit 106 and is used to gate the bus setting to the compare unit. Line 212 branches to a line 214 which extends via an OR circuit 216 (FIG. 10D) to line 12 and is employed to gate zeros to the compare unit. If there are no waiting controllers of the first class, there will be all zeros on the bus and this condition is manifested by the compare unit's finding of equality. If there are waiting controllers of the first class, the compare unit will find inequality.

To sample the compare unit, line 212 (FIG. 10E) branches to line 218, the active state of which extends through gate 176 (FIG. 10E) at B pulse time to enable a gate 220. If gate 220 is producing an output on line 222, the "Bus Available" flip-flop is reset to the "0" state. If gate 220 is producing an output on line 224, flip-flop 226 (FIG. 10G) is set to the "1" state. At C pulse time in the fifth cycle, the setting of flip-flop 226 is transferred to flip-flop 228. With this arrangement, the operations D and E as shown in FIG. 13B are caused to occur in the sixth cycle.

In the sixth cycle, it is desired to take advantage of the possibility that some controllers may have changed from a non-wating to a waiting status in the period that flip-flop 84 (FIG. 10C) was in the set state in the first cycle. It is to be noted that in the sixth cycle, control passes back to "Wait" flip-flop 40 instead of to flip-flop 84.

In operation E of the sixth cycle (FIG. 13B), line 230 (FIG. 10G) becomes active and its active condition extends through an OR circuit 232 to line 234 which extends through an OR circuit 106 (FIG. 10D) to line 2 which is employed to gate the bus setting to the compare unit. Line 234 branches to line 236 which extends through OR circuit 74 (FIG. 10D) to line 16, the output on line 16 being employed to gate the index number $I_1$ to the compare unit Line 234 also branches to line 238 which extends through OR circuit 66 to line 18, the output on line 18 being employed to gate the index number $I_1$ to the bus.

The active condition of line 234 extends at B pulse time through a line 240 and gate 202 to enable a gate 242. If the compare unit finds inequality, an output appears on line 244 to reset the "Bus Available" flip-flop to the "0" state and the controller is thus apprised that it has lost the contest. If, however, an output appears on line 246, the controller is apprised that it must still compete with other possible waiting controllers that have the same index number $I_1$. An output on line 246 sets a flip-flop 248 (FIG. 10G) to the "1" state. At C pulse time in the sixth cycle, the setting of flip-flop 248 is transferred to a flip-flop 250 which permits an operation F in the seventh cycle (FIG. 13B).

At A pulse time and in the seventh cycle, a line 252 (FIG. 10H) becomes active to activate line 194 through an OR circuit 192 (FIG. 10G). The events that thereupon ensure for an F operation (seventh cycle, FIG. 13B) are the same as those described for a C operation.

In the sixth cycle, an operation D (FIG. 13B) is performed concurrently with an operation E. This operation D can succeed only if there are no waiting controllers in either class. At A pulse time in the sixth cycle, a line 254 (FIG. 10G) becomes active. Line 254 extends to line 2 through OR circuit 106 to gate the bus setting to the compare unit. Line 254 branches to line 256, the output on line 256 being effective through OR circuit 216 and line 12 to gate zeros to the compare unit. Line 254 also branches to line 258, the output on line 258 being effective at B pulse time through gate 202 to enable a gate 260 (FIG. 10G). A controller whose compare unit finds equality produces an output on line 262 which sets the "Bus Available" flip-flop to the "1" state. This occurs if there are no waiting controllers in either class. A compare unit that finds inequality, will have an output on line 264 which, through OR circuit 186, resets the "Bus Available" flip-flop to the "0" state.

The foregoing is the description of the "Release Bus" sequence.

*"Seize Bus" sequence*

Any controller whose "Bus Available" flip-flop is in the "1" state at the time that its "Wait" flip-flop (Flip-flop 40, FIG. 10C) is set to the "1" state can enter this sequence. The controller will be successful in obtaining command of the bus if it is the only controller attempting to seize the bus or if its index number is greater than that of any other controller that attempts to seize the bus at the same time. If it is the only controller attempting to seize the bus, only one cycle is required. If it is not the only controller attempting to seize the bus, then three cycles are required, the latter two of these three cycles being the same as cycles E and F as depicted in FIG. 13B. In the case of a tie, a losing controller only goes through cycle E. A controller that has a chance of winning the tie proceeds to cycle F.

Figure 10H:
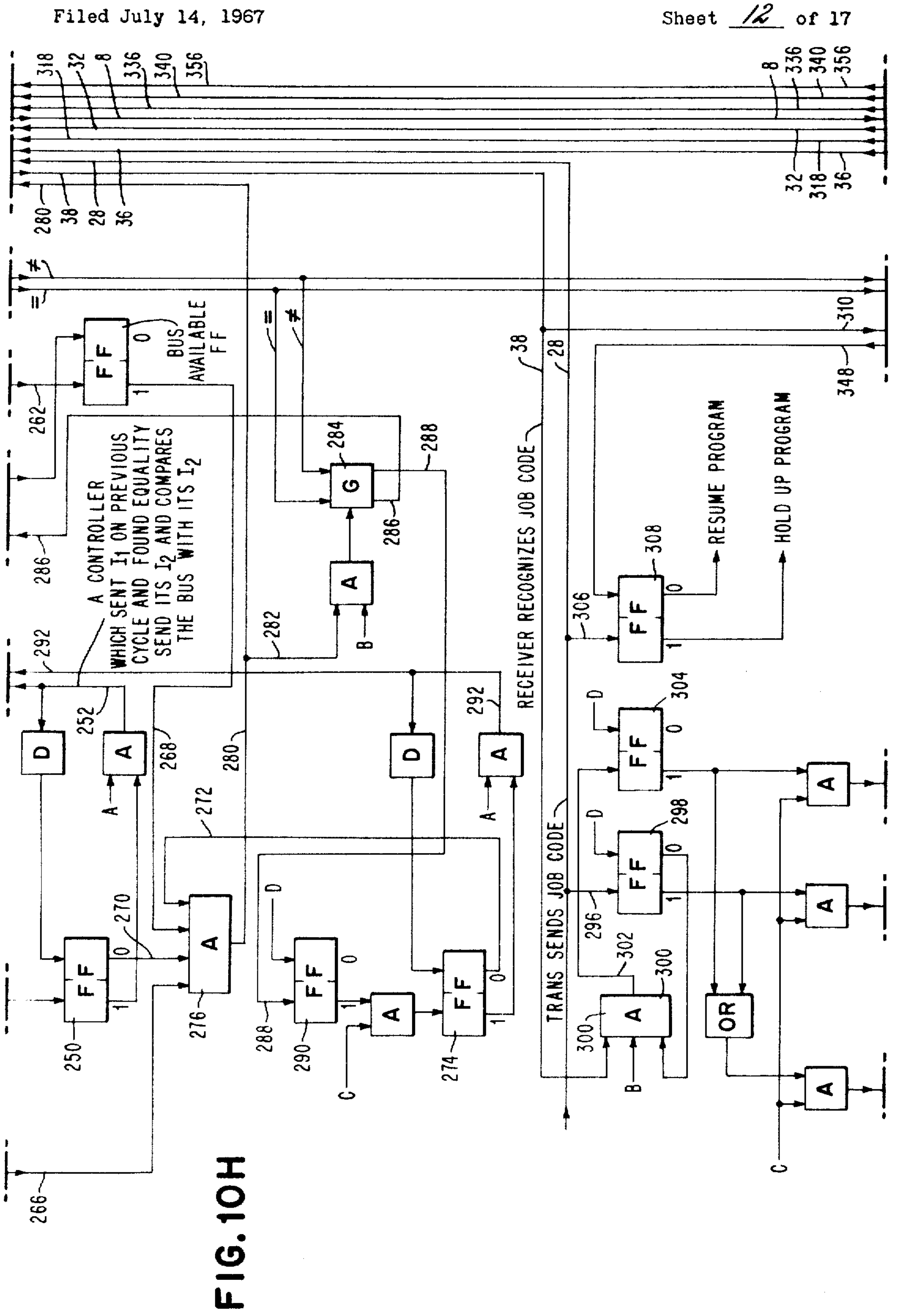

Referring to FIG. 10H, the lines 266 and 268 shown therein are active. The lines 270 and 272 also have to be active and they will so be if the flip-flops 250 and 274 are in the "0" state since the latter state is necessary in order that an AND circuit 276 be enabled. Flip-flop 274 is in the "1" state during the first tie-breaking cycle which may follow the cycle during which the seizure code is set and flip-flop 250 is in the "1" state during the second tie-breaking cycle. As "Wait" flip-flop 40 may not be reset to zero until the second tie-breaking cycle, it is necessary to disable AND circuit 276 for the two tie-breaking cycles. In order words, AND circuit 276 is enabled for the cycle during which the seizure code is sent but is disabled for the two tie-breaking cycles which may follow the seizure code sending cycle.

Thus, if AND circuit 276 is enabled at A pulse time, a line 280 is activated, the output on line 280 being effective through an OR circuit 106 to activate line 2 which gates the bus setting to the compare unit. Line 280 branches to line 11 (FIG. 10D), the output on line 11 gating the seizure code to the compare unit. Line 280 also branches to a line 30 (FIG. 10F), the output on line 30 gating the seizure code to the bus. As seen in FIG. 10H, line 280 branches to line 282, the output on line 282 being effective at B pulse time to enable a gate 284. If the compare unit finds equality, it knows that no other controller is attempting to seize the bus and gate 284 produces an output on line 286 which activates line 210 through OR circuit 208. The output on line 210 resets "Wait" flip-flop 40 to "0" and instructs the controller to proceed with its program as it has control of the bus.

If the compare unit finds equality, gate 284 will produce an output on line 288 to set a flip-flop 290 to the "1" state. At C pulse time, the setting of flip-flop 290 is transferred to a flip-flop 274 and at A pulse time in the next cycle, line 292 becomes active. The output on line 292 is effective through an OR circuit 232, to activate line 234 whereby the cycle hereinabove described as the E cycle (FIG. 13B) ensues and the F cycle will automatically follow for those controllers that have a chance of winning the tie.

*"Count Off" sequence*

Figure 10I:
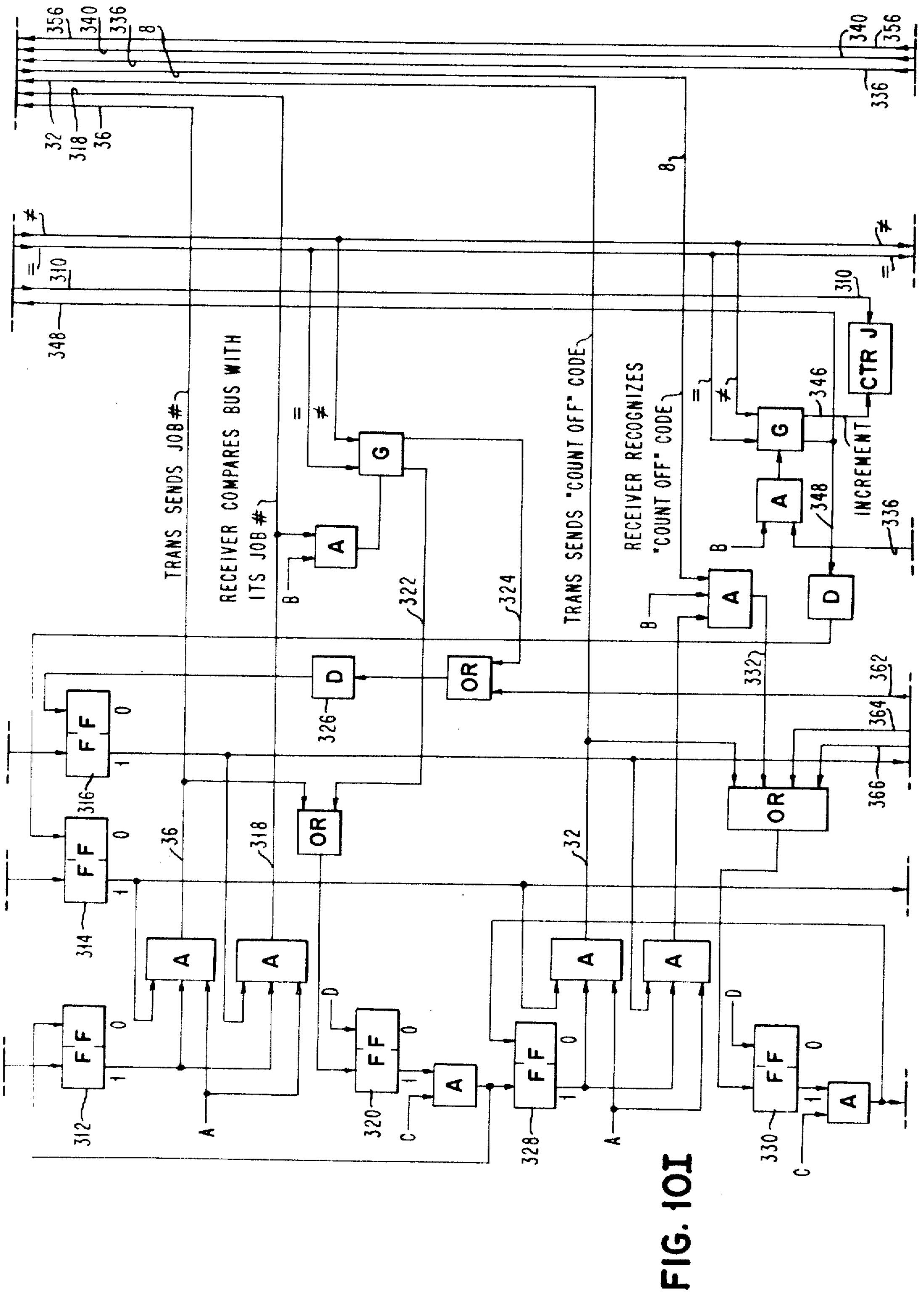
Figure 10J:
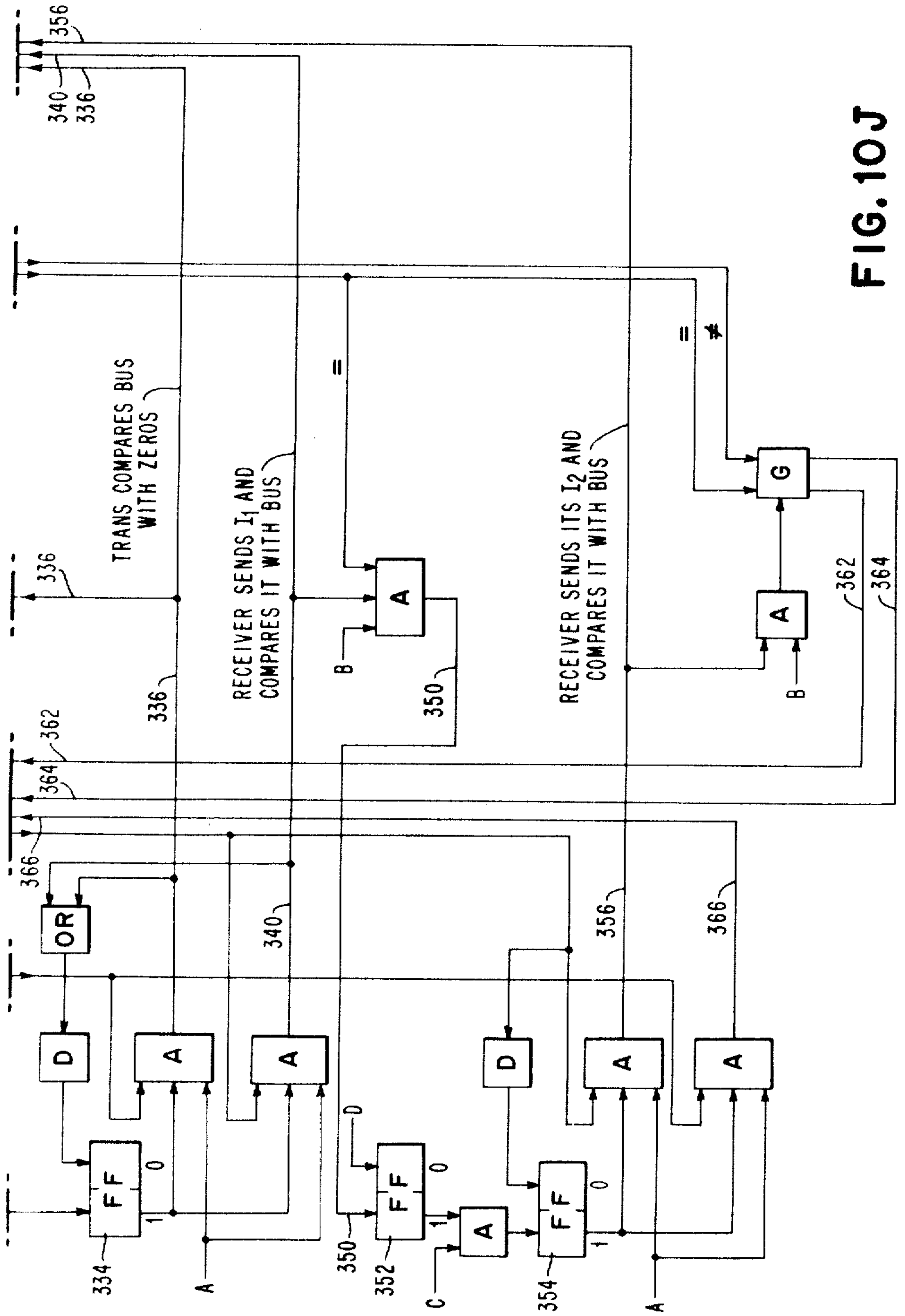

A controller that has command of the bus and that wishes to initiate this sequence would activate line 28 (FIG. 10H) at A pulse time in a cycle. Such activating would occur as the result of an instruction in the program that the controller is executing. Line 28 branches to a line 296, the output on line 296 setting a flip-flop 298 to the "1" state. The output on line 28 is also effective to gate the "job code" to the bus. The "job code" decoder (FIG. 10B) in all controllers then produces an output on line 38. The output on line 38 is one input to an AND circuit 300 (FIG. 10H) at D pulse time producing an output on line 302 in all of the controllers except the transmitting controller, such output setting a flip-flop 304 to the "1" state. The AND circuit 300 in the transmitting controller is disabled because flip-flop 298 therein is in the "1" state. In the transmitting controller, the active state of line 28 branches to line 306 (FIG. 10H), the output on line 306 setting a flip-flop 308 to the "1" state. It is intended that flip-flop 308, when it is in its "1" state, hold up the execution of the program in the transmitting controller until the "Count Off" sequence is completed since the number of cycles in the "Count Off" sequence varies depending upon the number of controllers that are working on the same job. Line 28 also branches to a line 310, the output on line 310 being employed to reset counter J. (FIG. 10I).

At C pulse time in the first cycle, in all controllers, a flip-flop 312 is set to the "1" state. At the same time in the transmitting controller, a flip-flop 314 is set to the "1" state and in all of the receiving controllers a flip-flop 316 is set to the "1" state. At A pulse time in the second cycle in the transmitting controller, line 36 becomes active, the output on line 36 gating the job number register (FIG. 10B) to the bus. This register may be loaded from the program by means not shown. At the same time, in the receiving controllers, their respective line 318 become active, the output on a line 318 being applied as an input to OR circuit 106 (FIG. 10D). The output of OR circuit 106 appears on line 2 and is effective to gate the bus setting to the compare unit. Line 318 branches to line 34 (FIG. 10F), the output on line 318 being employed to gate the contents of the "job number" register to the compare unit.

In the transmitting controller, a flip-flop 320 (FIG. 10I) is set to the "1" state when line 36 becomes active. In a receiver whose compare unit finds equality, a line 322 becomes active at B pulse time to set flip-flop 320 to the "1" state. In a receiving controller that finds inequality, a line 324 becomes active and, through a delay unit 326, resets a flip-flop 316 to the "0" state. The output of delay unit 326 can occur at C pulse time in the second cycle. Thus, only the receiving controllers whose job number agrees with the job number of the transmitting controller perform after the first two cycles. At C pulse time in the second cycle, the setting of flip-flop 320 is transferred to a flip-flop 328.

At A pulse time in the third cycle in the transmitting controller, line 32 (FIG. 10I) becomes active, the output on line 32 being effective to gate the "Count Off" code to the bus. When line 32 becomes active, it sets a flip-flop 330 in the transmitting controller to the "1" state. In the receiving controllers concerned in the operation, line 32 becomes active at B pulse time and, in a receiving controller, the active state of line 332 is employed to set flip-flop 330 to the "1" state. At C pulse time in the third cycle, the setting of flip-flop 330 is transferred to a flip-flop 334.

At A pulse time in the fourth cycle in the transmitting controller, line 336 becomes active, the output on line 336 being applied as an input to OR circuit 106 (FIG. 10D) where it activates line 2 to gate the bus setting to the compare unit. Line 336 (FIG. 10J) branches to line 338, the output on line 338 being effective through an OR circuit 216 and line 12 to gate zeros to the compare unit. At the same time, in a receiving controller, the line 340 (FIG. 10J) becomes active, the output on line 340 being applied to OR circuit 106 (FIG. 10D), the output of OR circuit 106 appearing on line 2 to gate the bus setting to the compare unit. Line 340 branches to line 342, the output on line 342 being applied as an input to OR circuit 74. The output of OR circuit 74 appears on line 16 and gates index number $I_1$ to the compare unit. Line 340 also branches to line 344, the output on line 344 being effective through OR circuit 66 and line 18 to gate the index number $I_1$ to the bus. Thus, each responding receiving controller places its index number $I_1$ on the bus and compares the bus setting with its index number $I_1$.

If at B pulse time in the fourth cycle, transmitting controller compare unit finds inequality, it is apprised that there is at least one responding controller and line 346 becomes active to increment counter J. If the compare unit of the transmitting controller finds equality, it is apprised that there is no responding controller and line 348 becomes active to reset flip-flop 316 and flip-flop 308. If there are responding controllers, the one or ones with the greatest index numbers $I_1$ will find equality and, at B pulse time in the fourth cycle, a line 350 becomes active to set a flip-flop 352 (FIG. 10J) to the "1" state. At C pulse time in the fourth cycle, the setting of flip-flop 352 is transferred to a flip-flop 354.

Thus, in the fifth cycle in a responding controller that found equality in the fourth cycle, line 356 becomes active at A pulse time, the output on line 356 being applied as an input to OR circuit 106 and is effective through line 2 to gate the bus setting to the compare unit. Line 356 (FIG. 10J) branches to line 358, the output on line 358 being effective through an OR circuit 138 and line 22 to gate the index number $I_2$ to the compare unit. Line 356 also branches to line 360 and is effective via OR circuit 130 and line 24 to gate the index number $I_2$ to the bus. At D pulse time in the fifth cycle, the responding controller with the largest index number $I_2$ will find equality. Consequently, line 362 (FIG. 10J) becomes active to reset flip-flop 316 and remove the controller from the sequence as it was this controller that was counted in the previous cycle. Any responding controllers that find inequality have to repeat the fourth and fifth cycles, the latter repetition being effected by line 364 (FIG. 10J) which sets flip-flop 330 to the "1" state. The transmitting controller does nothing in the fifth cycle. However, line 366 becomes active in order that it can repeat the fourth cycle.

The "Count Off" sequence is set forth in the following chart.

| Cycle | Transmitter | Receiver |
|---|---|---|
| 1 | Sends "Job" Code | Responds to Job Code. |
| 2 | Sends Job # | Compares bus with its Job #. If=, continues sequence. If ≠, drops out of sequence. |
| 3 | Sends "Count Off" Code | Enters "Count Off" sequence. |
| 4 | Compares bus to zeros. If ≠, adds to counter. If =, terminates sequence. | Sends $I_1$ and compares bus with its $I_1$. If =, sends $I_2$ on next cycle. If ≠, does nothing on next cycle and then repeats cycle 4. |
| 5 | Nothing | Sends $I_2$ and compares bus with its $I_2$. If =, drops out of sequence. if≠, repeats cycles 4 and 5. |

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a data processing system including a plurality of active entities, an interaction control arrangement comprising:

an interaction control unit associated with each active entity;

means in each control unit responsive to commands from its associated active entity for executing instruction sequence specified by said entity;

means in each control unit for executing instruction sequences specified by other control units;

common bus means connected to each of said control units for enabling direct intercommunication between said control units;

discrete means respectively included in each control unit for providing the control unit with a unique common bus seizure code;

means included in each control unit for placing its seizure code on said bus and for ascertaining the seizure code present on said bus; and means provided in each control unit for comparing its seizure code with the seizure code on said bus, an equality result from such comparison representing the availability state of said bus.

2. In a multiprocessing system including a plurality of processors, an interaction control arrangement comprising:

an interaction control unit associated with each processor;

means in each control unit responsive to commands from its associated processor for executing instruction sequences specified by said processor;

means in each control unit for executing instruction sequences specified by other control units;

common bus means connected to each of said control units for enabling direct intercommunication between said control units;

discrete means respectively included in each control unit for providing said control units with unique common bus seizure codes;

means included in each control unit for applying its seizure code to said bus and for ascertaining the seizure code present on said bus;

means provided in each control unit for comparing its seizure code with the seizure code on said bus, the result of such comparison representing availability state of said bus; and means included in each control unit for the effecting of the release of said bus from a control unit in command thereof.

3. An interaction control arrangement for a multiprocessing system which includes a plurality of processors comprising:

an interaction control unit associated with each processor;

common bus means connected to each of said control units for enabling direct communication between said control units;

each of said control units comprising, means responsive to commands from its associated processor for executing instruction sequences specified by such processor, means responsive to commands from other control units for executing instruction sequences specified by said other control units, means for respectively providing each control unit with a unique common bus seizure code, means for applying said seizure code to said bus and for ascertaining the seizure code present on said bus, means for comparing said unique seizure code with said code on said bus, a chosen result from such comparison representing the available state of said bus, all other results from said comparison representing a conflict over control of said bus, and means for effecting the release of said bus from the command of said control unit; and tie-breaking means responsive to the simultaneous attempts of a plurality of control units to take control of said bus for selecting one of said last-named control units for command of said bus.

4. An interaction control arrangement for a multiprocessing system which includes a plurality of processors comprising:

an interaction control unit associated with each processor;

common bus means connected to each of said control units for enabling direct communication between said control units;

each of said control units comprising, means responsive to commands from its associated processor for executing instruction sequences specified by such processor, means responsive to commands from other control units for executing instruction sequences specified by said other control units, means for respectively providing each control unit with a unique common bus seizure code, means for applying said seizure code to said bus and for ascertaining the seizure code present on said bus, means for comparing said unique seizure code with said code on said bus, a chosen result from such comparison representing the available state of said bus, all other results from said comparison representing a conflict over control of said bus, means for providing a unique index code to each control unit, and means for effecting the release of said bus from the command of said control unit; and tie-breaking means responsive to the simultaneous attempts of a plurality of control units to take control of said bus for selecting one of said last-named control units for command of said bus, said tie-breaking means including means for causing said last-named control units to arrange themselves into a first and higher index code class and a second and lower index code class and means for selecting as the winner of said tie a member of a chosen one of said classes.

5. An interaction control unit as defined in claim 4 wherein said selecting means is arranged to choose said winner from said lower index code class.

6. An interaction control arrangement for a multiprocessing system which includes a plurality of processors comprising:

an interaction control unit associated with each processor;

common bus means connected to each of said control units for enabling direct communication between said control units;

each of said control units comprising, means responsive to commands from its associated processor for executing instruction sequences specified by said processor, means responsive to commands from other control units for executing instruction sequences specified by said other control units, means for respectively providing each control unit with a unique common bus seizure code, means for applying said seizure code to said bus and for ascertaining the seizure code present on said bus, means for comparing said unique seizure code with said code on said bus, a chosen result from such comparison representing the available state of said bus, all other results from said comparison representing a conflict over control of said bus, means for providing a unique index code to each control unit, and means for effecting the release of said bus from the command of said control unit; and count-off means for determining which of said interaction control units are working on the same job, said count-off means comprising, means for a control unit in command of said bus to interrogate all of the other of said control units as to which of them are working on said same job, and means responsive to said interrogation for causing of said control units working on said same job to respond in a first cycle and to count the one of said last-named control unit having said highest index code, for causing all of said last-named control units less said counted control unit to respond in a second cycle and to count only the control unit having the highest index code in the responders in said cycle and to continue said responding and a like count-off elimination on sucessive cycles until no more of said last-named control units remain to respond.

7. An interaction control arrangement as defined in claim 6 wherein said index code is a number expressed in two octal digits.

8. An interaction control arrangement for a multiprocessing system which includes a plurality of processors comprising:

an interaction control unit associated with each processor;

common bus means connected to each of said control units for enabling direct communication between said control units;

each of said control units comprising, means responsive to commands from its associated processor for executing instruction sequences specified by such processor, means responsive to commands from other control units for executing instruction sequences specified by said other control units, means for respectively providing each control unit with a unique common bus seizure code, means for applying said seizure code to said bus and for ascertaining the seizure code present on said bus, and means for comparing said unique seizure code with said code on said bus, a chosen result from such comparison representing the available state of said bus, all other results from said comparison representing a conflict over control of said bus;

tie-breaking means responsive to the simultaneous attempts of a plurality of control units to take control of said bus for selecting one of said last-named control units for command of said bus; and means associated with said tie-breaking means for determining the maximum and minimum of a set of numbers.

9. An introduction control arrangement as defined in claim 8 wherein said minimum determining means comprises means for determining the complement of said maximum.

10. An interaction control arrangement as defined in claim 8 wherein said seizure code is applied to said bus in a first cycle and said comparison is effected in a second and succeeding cycle.

References Cited

UNITED STATES PATENTS

| | | | |
|---|---|---|---|
| 2,946,986 | 7/1960 | Harrison | 340—172.5 |
| 3,231,862 | 1/1966 | Blosk et al. | 340—172.5 |
| 3,242,467 | 3/1966 | Lamy | 340—172.5 |
| 3,274,554 | 9/1966 | Hopper et al. | 340—172.5 |
| 3,286,240 | 11/1966 | Thompson et al. | 340—172.5 |
| 3,287,705 | 11/1966 | Ronenblatt et al. | 340—172.5 |
| 3,323,109 | 5/1967 | Hecht et al. | 340—172.5 |

PAUL J. HENON, *Primary Examiner.*

PO-1050
(5/69)

UNITED STATES PATENT OFFICE
CERTIFICATE OF CORRECTION

Patent No. 3,445,822 Dated May 20, 1969

Inventor(s) Graham C. Driscoll

It is certified that error appears in the above-identified patent and that said Letters Patent are hereby corrected as shown below:

Claim 1, column 15, line 55, the word "sequence" should be ---sequences--. Claim 6, column 17, line 31, delete "said" and add --such--. Claim 6, column 17, line 56, after the word "causing" add --all--. Claim 9, column 18, line 42, delete "introduction" and add --interaction--.

SIGNED AND SEALED
MAY 5 1970

(SEAL)
Attest:

Edward M. Fletcher, Jr.
Attesting Officer

WILLIAM E. SCHUYLER, JR.
Commissioner of Patents